(12) United States Patent
Geron et al.

(10) Patent No.: US 12,717,019 B2
(45) Date of Patent: Aug. 25, 2026

(54) DEVICE AND METHOD FOR CENTIMETRIC-LEVEL POSITIONING OF A MOVING OBJECT

(71) Applicants: PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); SORBONNE UNIVERSITE, Paris (FR)

(72) Inventors: Emmanuel Geron, Paris (FR); Jerome Lucas, Paris (FR); Stephane Hole, Paris (FR); Thierry Ditchi, Paris (FR)

( * ) Notice: Subject to any disclaimer, the term of this patent is extended or adjusted under 35 U.S.C. 154(b) by 264 days.

(21) Appl. No.: 18/291,422

(22) PCT Filed: Jul. 25, 2022

(86) PCT No.: PCT/EP2022/070842
§ 371 (c)(1),
(2) Date: Jan. 23, 2024

(87) PCT Pub. No.: WO2023/002064
PCT Pub. Date: Jan. 26, 2023

(65) Prior Publication Data

US 2024/0345241 A1 Oct. 17, 2024

(30) Foreign Application Priority Data

Jul. 23, 2021 (FR) ....................................... 2107985

(51) Int. Cl.
*G01S 13/84* (2006.01)
*G01S 13/82* (2006.01)
*G01S 13/87* (2006.01)

(52) U.S. Cl.
CPC ............ *G01S 13/84* (2013.01); *G01S 13/825* (2013.01); *G01S 13/878* (2013.01)

(58) Field of Classification Search
CPC ...... G01S 13/84; G01S 13/825; G01S 13/878; G01S 11/02; G01S 5/0063
(Continued)

(56) References Cited

U.S. PATENT DOCUMENTS 5,764,188 A * 6/1998 Ghosh ..................... G01S 5/145 455/456.1
6,107,910 A * 8/2000 Nysen ................... G01S 13/755 340/10.3
(Continued)

FOREIGN PATENT DOCUMENTS

EP 1271178 A2 * 1/2003 ............ H04W 64/00
EP 1319959 B1 * 1/2010 .......... H04W 52/226
(Continued)

OTHER PUBLICATIONS

Panta, B. R., Kido, K., Yasuda, S., Hanado, Y., Kawamura, S., Hanado, H., Takizawa, K., Inoue, M., & Shiga, N. (Jun. 6, 2018). Range Variation Monitoring with Wireless Two-Way Interferometry (Wi-Wi). arXiv.org. https://arxiv.org/abs/1806.02130.
(Continued)

*Primary Examiner* — Nuzhat Pervin
(74) *Attorney, Agent, or Firm* — Patshegen IP; Moshe Pinchas

(57) ABSTRACT

The positioning system (9) comprises a device (10) and a plurality of fixed bases (12), which comprise a counter cyclically browsing n pointer positions.
The device comprises an emitter configured to emit a request comprising at least one point pattern whose values read with the pointer modulate a carrier.
Each receiving base emits a response:
(Continued)

a) repeating the pattern received by the base from the device; and/or
b) representative of a first temporal pattern offset, measured by the base, between the pattern received and an identical pattern stored in the memory of the base.

The device comprises:
a means for measuring a second temporal pattern offset between the values of pattern points received in each response and the values stored in the memory of the device;
a means for determining the distance between the device and each base as a function of:
a) the total pattern offset between the pattern emitted by the device and the repeated pattern received by the device from the base; and/or
b) the second pattern offset and the first pattern offset measured by the base.

20 Claims, 13 Drawing Sheets

(58) Field of Classification Search
USPC .......................................................... 342/125
See application file for complete search history.

(56) References Cited

U.S. PATENT DOCUMENTS 6,882,306 B2* 4/2005 Pietila .................. G01S 19/252 342/357.69
7,128,270 B2* 10/2006 Silverbrook ....... H04N 1/00968 235/462.46
7,626,539 B2* 12/2009 de Salas ................ G01S 19/03 342/357.31
7,991,362 B2* 8/2011 Lane ................ H04W 56/0035 342/357.34
8,711,038 B2* 4/2014 Reede .................. G01S 5/0289 342/463
9,024,810 B2* 5/2015 Lohbihler .............. G01S 15/10 342/134
9,383,441 B2* 7/2016 Younis .................. H01Q 15/14
9,529,075 B2* 12/2016 Seitz ......................... G01S 3/30
10,073,530 B2* 9/2018 Moshfeghi ............. G06F 3/017
10,338,194 B2* 7/2019 Hedley ................. G01S 5/0218
10,473,784 B2* 11/2019 Puglia .................... G01S 17/42
11,119,223 B2* 9/2021 Dill ......................... G01S 19/22
11,525,908 B2* 12/2022 Laghezza ............. G01S 13/583
11,614,531 B2* 3/2023 Wu ...................... G01S 13/449 342/149
12,381,641 B2* 8/2025 Kurras .................. H04B 17/27
2003/0142288 A1* 7/2003 Kinrot .................... G01P 3/806 356/28
2004/0190085 A1* 9/2004 Silverbrook ....... H04N 1/32778 358/539
2004/0190092 A1* 9/2004 Silverbrook ....... H04N 1/00358 358/539
2005/0053099 A1* 3/2005 Spear ............... H04W 56/0045 370/508
2005/0254106 A9* 11/2005 Silverbrook ............. H04N 1/46 358/539
2009/0029715 A1* 1/2009 Burchardt ............ H04W 64/00 455/456.1
2010/0321245 A1* 12/2010 Aoki ...................... G01S 13/87 455/73
2011/0279366 A1* 11/2011 Lohbihler ............ G06F 3/0346 702/158
2014/0035732 A1* 2/2014 Karr .................. G06K 7/10069 340/10.5
2014/0313165 A1* 10/2014 Lam ................... G06F 3/03542 345/175
2015/0198719 A1* 7/2015 Mulherin ................. G01S 5/14 342/357.29
2015/0309154 A1* 10/2015 Lohbihler .............. G06F 3/011 342/134
2016/0069982 A1* 3/2016 Meyer .................. G01S 5/0252 702/94
2016/0223636 A1* 8/2016 Lohbihler ........... H01H 13/023
2018/0199304 A1* 7/2018 Wilson ................... H04W 4/02
2018/0324552 A1* 11/2018 Kumar ................. H04W 4/027
2018/0341025 A1* 11/2018 Vervisch-Picois ...... G01S 19/11
2019/0182629 A1* 6/2019 Priyanto ............ H04W 64/003
2019/0319722 A1* 10/2019 Yu ......................... G01S 13/84
2020/0150214 A1* 5/2020 Neufeldt .............. G01S 13/878
2020/0219204 A1* 7/2020 Moetteli ............... A47B 83/02
2021/0058740 A1* 2/2021 He .......................... G01S 5/12
2022/0221551 A1* 7/2022 Larignon ................. G01S 5/02
2022/0299590 A1* 9/2022 Booij ........................ G01S 5/02
2023/0208420 A1* 6/2023 Lohbihler .............. G01S 13/10 324/171
2024/0019534 A1* 1/2024 Li ............................ G01S 5/06
2024/0125883 A1* 4/2024 Carrabin .............. G01S 1/0428
2024/0284364 A1* 8/2024 Georgi ................ H04J 13/0062
2024/0386507 A1* 11/2024 Moetteli ............... A47B 83/02

FOREIGN PATENT DOCUMENTS

EP 2189804 A1 * 5/2010 ............. G01S 17/10
EP 2420857 A1 * 2/2012 ............... G01S 5/10
EP 3436845 B1 * 7/2023 ............. G01S 17/32
EP 3775992 B1 * 7/2023 ............. G01C 21/20
WO WO-2011047709 A1 * 4/2011 ............... G01S 5/04
WO WO-2013104060 A1 * 7/2013 .............. F21V 21/14
WO WO-2016184806 A1 * 11/2016 ........... G01S 5/0226
WO WO-2021048331 A1 * 3/2021 ......... G06F 21/6272
WO 2021058331 A1 4/2021

OTHER PUBLICATIONS

Search Report;Nov. 2, 2022.

* cited by examiner

DEVICE AND METHOD FOR CENTIMETRIC-LEVEL POSITIONING OF A MOVING OBJECT

TECHNICAL FIELD OF THE INVENTION

The present invention relates to a device and method for the centimetric positioning of a mobile unit in an outdoor or indoor environment. It applies, in particular, to the positioning of vehicles in urban areas, the autonomous driving of vehicles and mobile units, assistance for people that are visually impaired or with reduced mobility, the verification of the parking positions of self-service vehicles, tourism or advertising information.

STATE OF THE ART

Estimating the position of a vehicle in its traffic lane is a key element not only for autonomous travel but also for safety, by detecting unsuitable paths. Currently, the trend is towards using a large number of sensors on board the vehicle to recognise its surroundings, for example a satellite positioning system, cameras, radars and lidars, and thereby position the vehicle in a digital map. However, these systems are not very precise and are subject to many biases. The solutions based on satellite positioning suffer from electromagnetic wave multipathing in town, the positioning thus having a precision of a few metres.

Other systems use cameras to detect the side of the road or markings, e.g. in-ground reflectors, or lidars. The cameras and lidars are hampered by the temporal variance of scenes that blur the recognition factors, by the masking of landmarks by parked vehicles, and by the computing power required.

Another approach is cooperation between the vehicle and a fixed infrastructure. In this approach, the infrastructure and the vehicle communicate so as to ensure the quality of the information supplied. As a result, the tasks of the onboard systems are reduced and the reliability and robustness are increased. However, this requires substantial infrastructure investments.

Systems are known that comprise sensors on board a vehicle able to detect passive elements positioned on the road surface and determine their distance to the vehicle. These passive elements therefore serve as a precise reference point and, being simple and passive, they are very inexpensive. However, this technology is better suited to routes and is not directly applicable to the issues of towns or in private places, for example for parking in an underground car park. This is because, in a town, there are not always road markings in which to include passive elements, and the sides of the road are often obstructed, which hinders the direct paths and therefore precise positioning.

SUBJECT OF THE INVENTION

The present invention aims to remedy all or part of these drawbacks.

To this end, the present invention envisions, according to a first aspect, a system according to claim 1.

Thanks to these provisions, the precision of the positioning system is very high. As a minimum, when the offset measurement is an integer number of points of the pattern, for example in the case of measurement by autocorrelation, it is twice the length of time between the emission of two points of a pattern, multiplied by the propagation speed of the signal. When the measurement of the offset of points of the pattern is continuous, for example because it is based on a frequency analysis, for example by Fourier transform, the precision of the positioning can be much higher.

In some embodiments, the device, and each base if it comprises a means for measuring the pattern offset, comprises a means for measuring the phase shift of the carrier of a signal received relative to the phase of a sine-wave signal generated by a clock of the device, and a clock of each base if it comprises a means for measuring the offset, the means for determining the distance of the device adding the measured phase shift to the measured offset to measure the distance of the device to each base.

Thanks to these provisions, the precision of the positioning system is double the capacity to discriminate a phase shift of signals, multiplied by the propagation speed of the signal.

In some embodiments, the signal emitted by the device and by each base is in IQ quadrature and, for at least one predefined phase shift of the carrier of this signal, the signal on the I channel is constant and the signal on the Q channel carries the amplitude modulation of the pattern emitted by the device.

In some embodiments, to measure the first and second offsets, the base and the device comprise a means for performing a linear fit of the points of the pattern received in the IQ plane, each offset measured being equal to the pattern offset added to the phase shift measured, this measured phase shift being equal to the difference between

- the angle between the vertical in this plane and the straight line obtained by the linear fitting; and
- this predefined phase shift.

In some embodiments:

c) each base comprises a means for performing a linear fit of the points of the pattern received in the IQ plane, and a means for measuring the phase shift, this measured phase shift being equal to the difference between
   - the angle between the vertical in this plane and the straight line obtained by the linear fitting; and
   - this predefined phase shift;

the emitter of each base being configured to emit a negative phase-shifted IQ signal, relative to the signal received, of twice the phase shift measured so that the phase of the signal emitted by the base is in phase with the signal emitted by the device;

d) the device comprises a means for performing a linear fit of the points of the pattern received in the IQ plane, and a means for measuring the phase shift, this measured phase shift being equal to the difference between
   - the angle between the vertical in this plane and the straight line obtained by the linear fitting; and
   - this predefined phase shift, the total offset utilised by the device for measuring the difference being the sum of the total pattern offset added to the phase shift measured by the measurement means of the device.

Thanks to each of these provisions, the precision of the positioning system is double the capacity to discriminate a phase shift of a plurality of n colinear pattern points in the IQ plane, multiplied by the propagation speed of the signal. Because of the plurality of n points in the pattern, this precision is even greater than the precision obtained by the phase shift measurement of an amplitude-modulated sinusoidal signal.

In some embodiments, the period of the counters is more than double the maximum time of flight corresponding to a predefined maximum distance between the device and a base likely to respond to a request from this device.

In some embodiments, a pattern of n points is an inverse Fourier transform of a spectrum with constant amplitude and random or pseudo-random phase.

Thanks to these provisions, the comparison of patterns used for determining the pattern time shift is more reliable.

In some embodiments, each emitter, of the device and the bases, is configured to emit signals over a plurality of carriers having different frequencies.

The ambiguity of the measurement of a distance modulo another distance linked to the carrier, can be resolved.

In some embodiments, the patterns emitted by all the devices and by all the bases are identical. Thanks to these provisions, implementation of the invention is made easier at the level of the means for measuring a pattern time shift.

In some embodiments, the patterns emitted by at least two different devices are different, the signal emitted by each device comprising data identifying or representing the pattern emitted by this device.

Thanks to these provisions, a base can identify the device, or the device itself can identify its own pattern, for measuring a pattern time shift.

In some embodiments, the patterns emitted by at least two different bases are different, the signal emitted by each base comprising data identifying or representing the pattern emitted by this base.

Thanks to these provisions, the device can identify each base with the pattern it receives.

In some embodiments, each signal emitted by a base comprises an identifier of this base, the determination means of the device being configured to determine the position of this base by means of its identifier.

In some embodiments, the identifier of the base comprises its geographic position.

Thanks to these provisions, the device does not need to store an up-to-date database of the positions of the different bases since the bases notify it of their up-to-date positions. Therefore the device is simplified and the positioning is more reliable.

In some embodiments, the frequencies of the signals emitted by all the devices and all the bases are in an ISM (industrial, scientific, and medical) band.

According to a second aspect, the present invention envisions a device of a system that is the subject of the invention.

According to a third aspect, the present invention envisions a base of a system that is the subject of the invention.

In some particular embodiments of this base, this base is configured to behave like a device towards other bases to verify its positioning, wherein the emitter is configured to emit a displacement message if the position determined is different from a previously saved position of this base.

In this way, the bases can verify and, if necessary, update their cadastral positions.

The Advantages are that:

- the geographic calibration of the network of distances between the bases is simple to implement, quick and is not labour intensive. It is therefore inexpensive;
- the regular measurement of the network of distances makes it possible to check and therefore verify at all times that it is operational, detect malfunctions and quickly correct errors.

In some embodiments, at least one base is configured to behave like a device towards other bases associated with cadastral points to determine its position.

According to a fourth aspect, this invention envisions a method according to claim 18.

In some embodiments, the method that is the subject of the invention comprises a step of assigning time intervals, or timeslots, to fixed bases according to their geographic position such that two fixed bases that exchange signals with the same fixed base do not have the same time interval assigned to each of them and to this same fixed base.

In this way, the risk of collision with second signals is sharply reduced.

In some embodiments, the method comprises a step of positioning fixed bases with respect to other bases associated to cadastral points.

According to a fifth aspect, the present invention envisions a use of the method that is the subject of the invention, the system that is the subject of the invention, the device that is the subject of the invention, and/or the base that is the subject of the invention, to direct a land or aerial vehicle, direct a pedestrian indoors or outdoors, indicate a parking fault for a self-service vehicle, geolocate elements in an environment, determine the position and orientation of a visualisation system comprising several devices for augmented reality purposes for civil engineering, leisure and tourism applications, determine gestures, for example for a gesture interface, or motion capture.

As the particular aims, advantages and features of the device, base, method and use that are the subjects of the invention are similar to those of the system that is the subject of the invention, they are not repeated here.

BRIEF DESCRIPTION OF THE FIGURES

Other advantages, aims and particular features of the invention will become apparent from the non-limiting description that follows of at least one particular embodiment of the device and method that are the subjects of the invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Throughout the description, the term "device" refers to the item of equipment that emits a positioning request, and the term "base" refers to each item of equipment that responds to a positioning request. As described in the description, preferably each base comprises an item of equipment that is similar, even identical, to the device, such that each base can determine its geographic position relative to other bases. Throughout the description, one considers that the device is mobile and the bases fixed, except in the case where a fixed base takes the role of device to determine its geographic position, as described with reference to FIG. 7. In some embodiments, at least one base is mobile, which enable the respective positioning of the mobile units that have a mobile base on board.

Note that the figures are not to scale.

Figure 1:
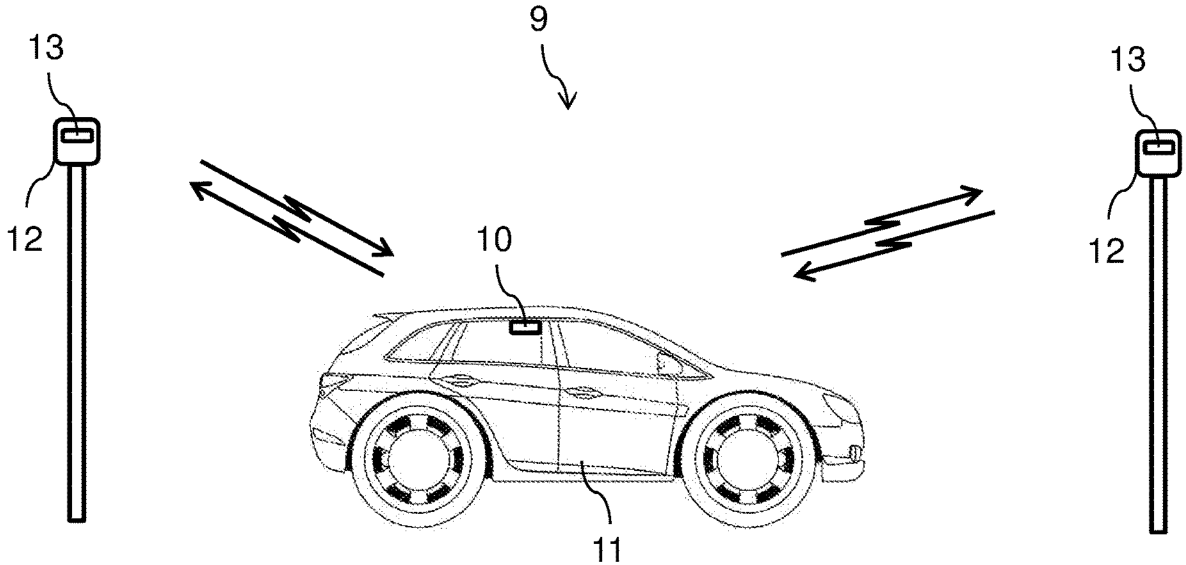
FIG. 1 represents, schematically, an onboard mobile device and two bases in communication with the device.

FIG. 1 shows, schematically, the environment of a positioning device 10, in the case where it is built into a vehicle 11. The mobile device 10 communicates with fixed bases 12, preferably installed at height, for example on lampposts, road signs, special masts, or on the walls of buildings. The device and the fixed bases 12 form a positioning system 9. The mobile device 10 and the fixed bases 12 each comprise a fixed electromagnetic wave emitter/receiver device 13 coupled to a calculation unit.

The positioning is obtained by the time of flight (acronym "TOF") of the electromagnetic waves between the mobile device 10 and the fixed bases 12. To determine the position of the mobile device 10, at least three distance measurements are needed, which, in the prior state of the art, requires the use of several fixed bases 12 and the precise frequency and phase synchronisation of all the emitter/receivers of the fixed bases 12, or the onboard mobile devices 10. The frequency synchronisation is relatively simple, but the phase synchronisation needs an absolute clock. In satellite positioning systems, this absolute clock is obtained by ultra-stable atomic clocks, which is not feasible in the case of a dense terrestrial network necessary for positioning in town or in buildings. The purpose of the present invention is to make distance measurements without using such an absolute clock.

It is assumed, for information purposes, that the oscillators of the emitter/receivers of the fixed bases 12 and of the onboard mobile devices 10 have substantially the same frequency f, but that the phase of one is not known to the other and vice versa. The fact of having exactly the same frequency f means that these unknown phases are constant over time. If the frequencies of the device and bases are only substantially equal and not equal, the unknown phases are slowly variable over time, which does not limit the precision of the positioning, as shown later. To eliminate this unknown phase shift, one uses the raw (I,Q) signals coming from the IQ modulators/demodulators installed in the emitter/receivers of the fixed bases 12 and of the onboard mobile devices 10 on the mobile units 11.

Note that quadrature amplitude modulation ("I/Q", "IQ" or "QAM") is a form of modulating a carrier by modifying the amplitude of the carrier itself and a wave in quadrature (a wave phase-shifted 90° from the carrier) according to the information transported by two input signals.

This means that the amplitude and phase of the carrier are modified simultaneously based on the information to be emitted.

When two analog signals are emitted using a QAM type of modulation, the emitted signal has the form:

$$s(t) = I(t)\cos(2\pi f_0 t) + Q(t)\cos(2\pi f_0 t + \pi/2)$$

where I(t) and Q(t) are the modulating signals and $f_0$ is the carrier frequency.

At the level of the receiver, the two modulating signals can be demodulated by using a coherent demodulator. Such a demodulator multiplies the signal received separately, firstly with a cosine and secondly with a cosine phase-shifted by π/2. The two multiplications will produce the estimates of the I(t) and Q(t) channels respectively. Thanks to the orthogonality property of the two carriers used, it is possible to extract the two modulating signals independently.

In an ideal scenario, the I(t) channel is demodulated by multiplying the signal received by a cosine signal:

$$r_i(t) = s(t)\cos(2\pi f_0 t)$$

$$r_i(t) = I(t)\cos(2\pi f_0 t)\cos(2\pi f_0 t) + Q(t)\cos(2\pi f_0 t + \pi/2)\cos(2\pi f_0 t)$$

Using the trigonometric identities gives:

$$r_i(t) = 1/2\, I(t)[1 + \cos(4\pi f_0 t)] + 1/2\, Q(t)\cos(4\pi f_0 t + \pi/2)$$

$$r_i(t) = 1/2\, I(t) + 1/2[I(t)\cos(4\pi f_0 t) + Q(t)\cos(4\pi f_0 t + \pi/2)]$$

A low-pass filter is applied to the signal $r_i(t)$, which removes the high-frequency components ($4\pi f_0 t$), and leaves only the term ½ I(t). It is noted that this signal is not affected by the Q(t) channel, which demonstrates that the I(t) channel can be received independently of the Q(t) channel. In a similar way, the Q(t) channel is received by multiplying the signal received s(t) by a cosine signal phase-shifted by π/2.

With regard to the IQ phase conventions, the terms "I component" (or "I channel") and "Q component" (or "Q channel") are common ways of designating the in-phase and quadrature phase signals, respectively. The two signals comprise a high-frequency (or carrier) sinusoid amplitude modulated by a relatively low-frequency function, generally carrying some information. The two carriers are orthogonal, I being offset ¼ cycle relative to Q or, in an equivalent way, preceding Q by ¾ cycle.

Figure 2:
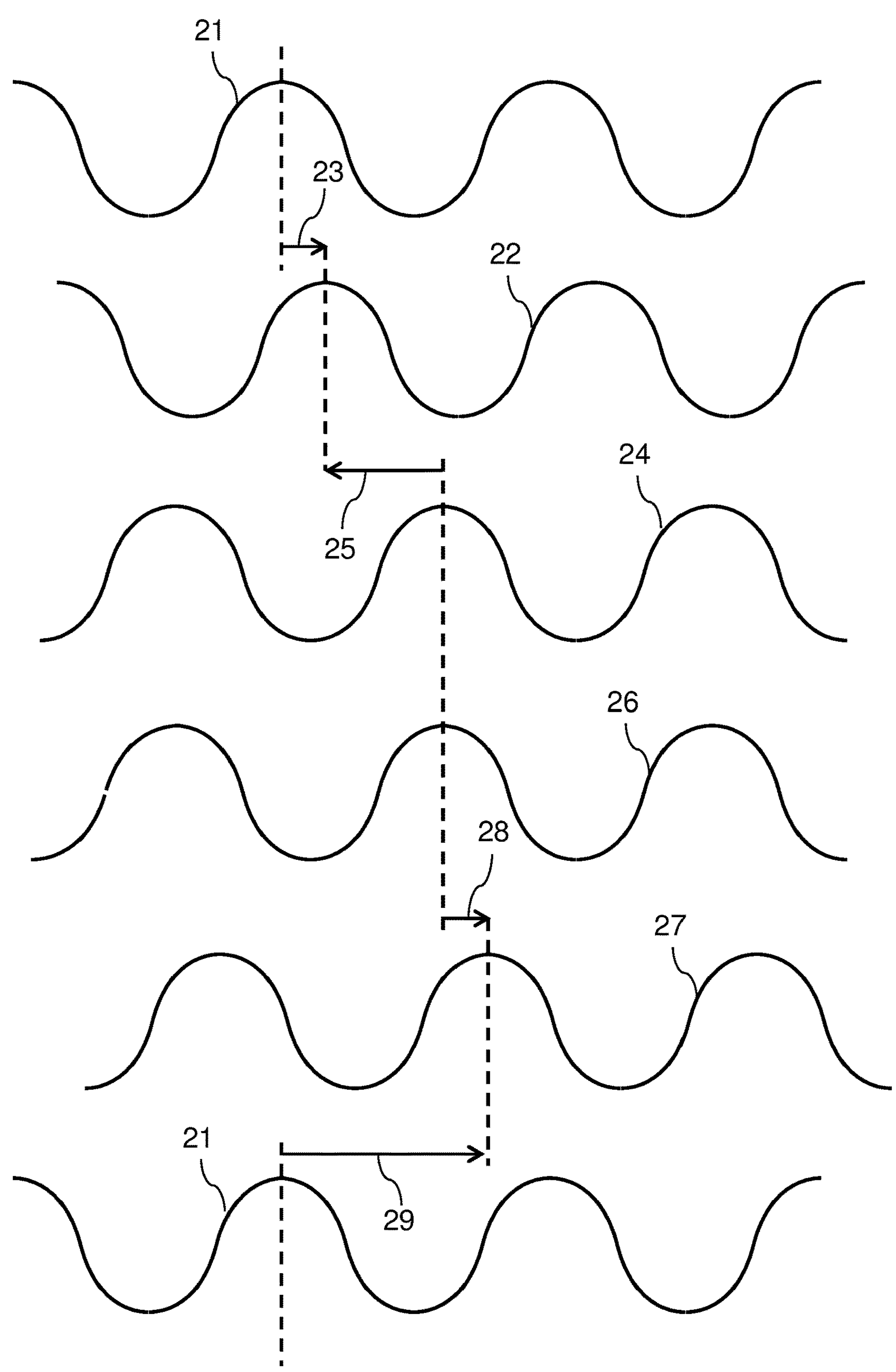
FIG. 2 represents, schematically, in the form of signals, a particular phase shift measurement.
Figure 3:
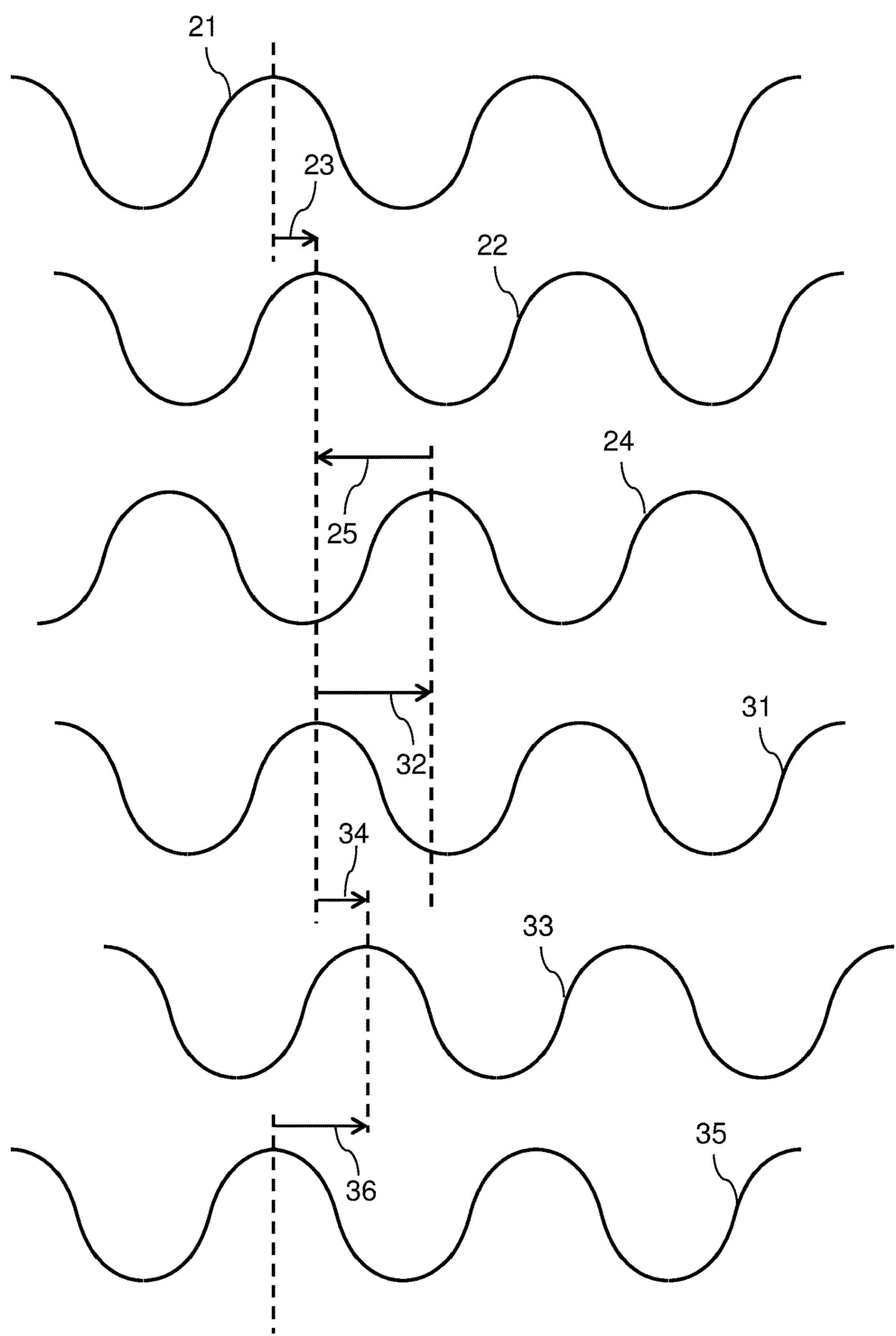
FIG. 3 represents, schematically, in the form of waves, another particular phase shift measurement.

In FIGS. 2 and 3, only one of these orthogonal sinusoids is shown to explain the operation of the phase shift and distance measurements, which corresponds to a constant I and/or Q component for an IQ quadrature signal.

A device 10 emits a first sinusoidal signal 21. Because of the time of flight for this signal 21 to reach a base 12, the signal 22 received by this base 12 is phase shifted relative to the signal 21, with a phase lag 23. This base 12 has a clock providing a signal 24, with a frequency substantially equal to the frequency of the signal 21, but phase shifted by an unknown phase difference, relative to the signal 21.

In the embodiment shown in FIG. 2, a base 12 that has received the signal 22 measures the phase lag 25 of the signal 22 relative to its clock 24. This base 12 then emits, to the device 10 having emitted the signal 21, a signal 26, synchronised with the clock signal 24 and a message representative of the phase lag 25. Because of the time of flight for this signal 26 to reach the device 10 having emitted the signal 21, the signal 27 received by this device 10 is phase shifted relative to the signal 26, with a phase lag 28 equal to the phase lag 23.

The device 10 measures the phase lag 29 of the signal 27 relative to the signal 21. The device extracts the value of the phase lag 25 of the message received from the base 12 and adds the phase lag 25 to the phase lag 29. In this way, the device 10 obtains twice the phase lag 23 and deduces from this the distance d between the device 10 and the base 12 which responded by returning the signal 26. This is because twice the phase lag 23 is equal to 4*pi*d/lambda, a formula in which lambda is the wavelength of the wave 21.

In other terms, when a wave 22 arrives at the receiver of a base 12, this receiver has no information as to when this wave was emitted by the emitter of the device 10. The base 12 can only determine the phase 25 of this wave in relation to that of its local oscillator. This phase, referred to as phi12 below, is measured directly using the signals (I2,Q2) obtained on output from the IQ demodulator of the base 12 by $$phi12=\text{angle}(Q2/I2)=phi2-(phi1-2*\pi*d/\text{lambda}) \quad (1)$$

where

- phi1 is the unknown phase of the local oscillator of the emitter of the device 10;
- phi2 is the phase of the local oscillator of the receiver of the base 12;
- d is the distance between the device 10 and the base 12; and
- lambda is the wavelength of the wave emitted by the device 10.

The phase 25 received on its own does not, therefore, enable the distance d to be determined when the phase of the local oscillator of the device 10 is not known.

The base 12 that has received the wave, sends a message containing the value phi12 to the device 10 that emitted the wave. The device 10 therefore receives, on output from its IQ demodulator, the signals (I1,Q1), which makes it possible to calculate the phase phi21 such that $$phi21=\text{angle}(Q1/I1)=phi1-(phi2-2*\pi*d/\text{lambda}) \quad (2)$$

In this expression (2), everything is known except the distance d, which can therefore be determined modulo a half wavelength lambda since $$phi12+phi21=4*\pi*d/\text{lambda} \quad (3)$$

Figure 6:
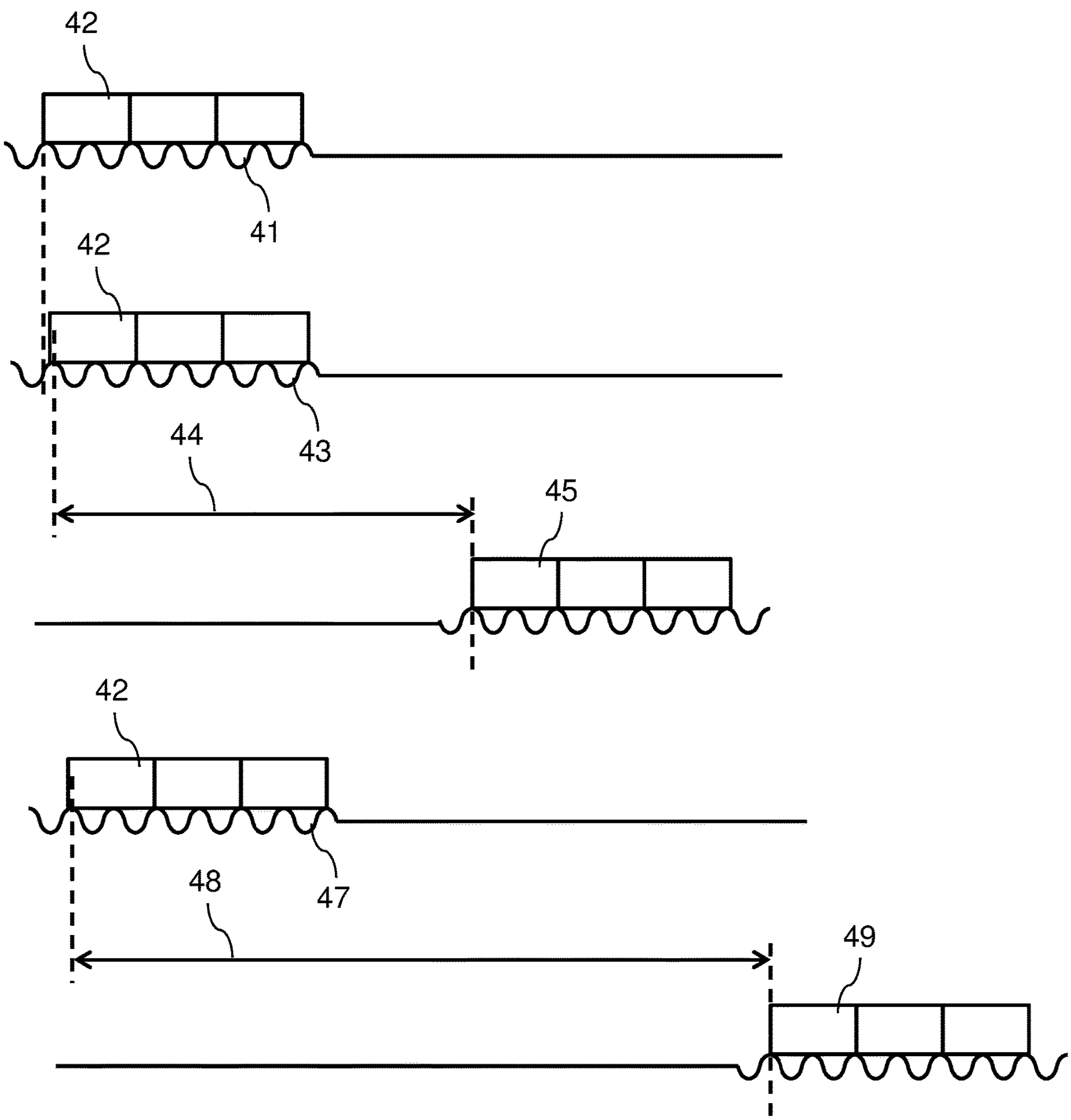
FIG. 6 represents, schematically, in the form of data frames, communications between a device and a base or between two bases.

The modulo uncertainty can be resolved, for example by using several frequencies f for the electromagnetic waves, and therefore several wavelengths, since lambda=c/f, where c is the speed of light; or by using known frame correlation techniques (see FIG. 6).

Figure 4:
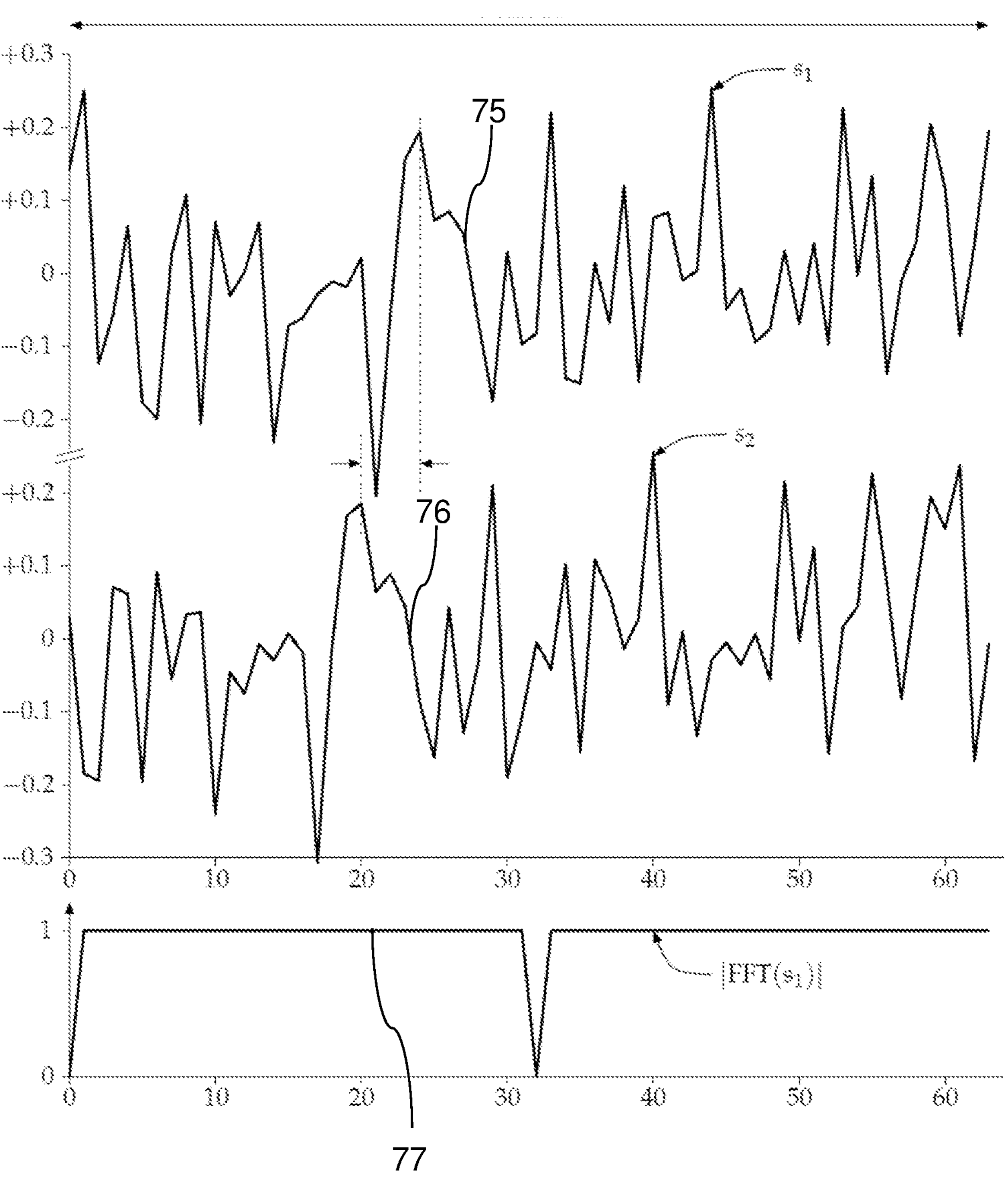
FIG. 4 represents an offset of a 64-point permanent periodic pattern emitted by a device relative to that of a base and an amplitude spectrum of the signal emitted by the device.

In an embodiment shown in FIG. 4, the modulo uncertainty is resolved by using a signal I(t) constant over time and a signal Q(t) corresponding to a permanent periodic pattern whose period corresponds to the round-trip time of an electromagnetic wave in the desired range of distances, and whose spectrum is dense up to a maximum frequency $f_{max}$ determined by the bandwidth of the communication system employed. A pattern on a given number of points is obtained, for example, by the inverse Fourier transform of a spectrum 77 with constant amplitude but random phase (see FIG. 4). When the signal received by the base is IQ demodulated, the base also records the permanent periodic signal it generates, and which has the same pattern as the pattern emitted by the device. The base thus determines the phase 25 by rotating its IQ plane by an angle such that the I component is constant. This angle is therefore the opposite of the desired phase 25 and the Q component obtained after rotation can be compared to the permanent periodic pattern recorded by the base at the time of reception, which makes it possible to obtain the offset of each relative to the other, either by using a correlation or by using the properties of the Fourier transform on the offset signals. Knowledge of the phase 25 and the offset calculated by the base for the outward signal and by the device for the return signal enables the distance to be obtained over a large range of distances with great precision. FIG. 4 shows the offset by 4.123 points of a 64-point permanent periodic pattern 75 emitted by the device ($s_1$) relative to the permanent periodic pattern 76, identical to the pattern 75, of the base ($s_2$).

In the embodiment shown in FIG. 4, the device 10 does not send a signal oscillating at a single frequency, but a signal 75 oscillating at the frequency of the first clock modulated by a known permanent periodic pattern 77, whose frequency support is limited to the authorised bandwidth. When the base 12 receives the signal from the device 10, the base 12 measures the phase between the carrier of the signal received and its local clock as described above, and also measures the time shift between the permanent periodic pattern received from the device 10 and the identical permanent periodic pattern generated in the base 12. The base 12 then sends to the device 10 a signal oscillating at the frequency of the second clock modulated by the permanent periodic pattern of the base 12, as well as the information about the phase shift between clocks and the offset between the patterns measured. When the device 10 receives this information, it can also measure the phase shift between the carrier of the signal received and its local clock and also the offset between the pattern received and its local permanent periodic pattern.

Having also received by a message the similar information for the base 12, the combination with the addition of phase shifts gives the distance between the device 10 and the base 12 modulo the wavelength. The combination with the addition of offsets gives the distance between the device 10 and the base 12 modulo the wavelength corresponding to the repetition frequency of the permanent periodic pattern. Therefore, the combination with pattern offsets 77 enables a large range of distances with precision which is limited by the bandwidth of the pattern, while the phase-shift combination gives precision below the wavelength. In a variant, the base 12 sends a signal oscillating at the frequency of the second clock phase shifted so as to be in phase with the carrier received modulated by a pattern offset so as to be in phase with the pattern received. Therefore, it is not necessary to send the phase-shift and offset information, the phase shift and offset received in return at the level of the device 10 are directly proportional to the distance between the device 10 and the base 12.

In the embodiment shown in FIG. 3, a base 12 that has received the signal 22 measures the phase lag of the signal 22 relative to its clock. This base 12 then emits, to the device 10 having emitted the signal 21, a signal 31, synchronised with the clock signal 24 with a phase lead 32 equal to the phase lag 25. The signal 31 is therefore in phase with the signal 22 received by this base 12.

Because of the time of flight for this signal 31 to reach the device 10 having emitted the signal 21, the signal 33 received by this device 10 is phase shifted relative to the signal 31, with a phase lag 34 equal to the phase lag 23. The device 10 measures the phase lag 36 between the signal 21 and the signal 33. In this way, the device 10 obtains twice the phase lag 23 and deduces from this the distance d between the device 10 and the fixed base 12 which responded by returning the signal 26. This is because twice the phase lag 23 is equal to 4*pi*d/lambda, a formula in which lambda is the wavelength of the wave 21.

In other terms, the base 12 sends what it receives to the device 10, where I=12 and Q=Q2. This is equivalent to sending a wave in phase with what had been received, as shown by the signals 22 and 31 of FIG. 3. In fact, if the device sends the signal $$I*\cos(2\pi f_0 t+phi1),$$

the base receives a signal proportional to $$I*\cos(2\pi f_0(t-d/c)+phi1)$$

because of the delay due to the propagation. After demodulation and filtering, the I and Q components measured by the base are respectively proportional to $$*\cos(-2\pi f_0 d/c+phi1-phi2) \text{ and } I*\cos(-2\pi f_0 d/c+phi1-phi2-\pi/2).$$

The base then sends the same IQ point, or an IQ point that is proportional to it, i.e. the signal $$I*\cos(-2\pi f_0 d/c+phi1-phi2)*\cos(2\pi f_0 t+phi2)+I*\cos(-2\pi f_0 d/c+phi1-phi2-\pi/2)*\cos(2\pi f_0 t+phi2+\pi/2),$$

that the device receives after the propagation delay, i.e.

$$I*\cos(-2\pi f_0 d/c+phi1-phi2)*\cos(2\pi f_0(t-d/c)+phi2)+I*\cos(-2\pi f_0 d/c+phi1-phi2-\pi/2)*\cos(2\pi f_0(t-d/c)+phi2+\pi/2).$$

After demodulation and filtering, the I and Q components measured by the device are respectively proportional to $$I*\cos(-2\pi f_0 d/c+phi1-phi2)*\cos(-2\pi f_0 d/c+phi2-phi1)+I*\cos(-2\pi f_0 d/c+phi1-phi2-\pi/2)*\cos(-2\pi f_0 d/c+phi2-phi1+\pi/2)$$

and $$I*\cos(-2\pi f_0 d/c+phi1-phi2)*\cos(-2\pi f_0 d/c+phi2-phi1-\pi/2)+I*\cos(-2\pi f_0 d/c+phi1-phi2-\pi/2)*\cos(-2\pi f_0 d/c+phi2+\pi/2-phi1-\pi/2),$$

which by using the rules of trigonometry lead respectively for the I component and the Q component, to $$I*\cos(4\pi f_0 d/c) \text{ and } I*\cos(4\pi f_0 d/c+\pi/2)$$

which shows that the phase $4*\pi*d/lambda=4\pi f_0 d/c$ is obtained independently of the unknown phases phi1 and phi2 of the clocks of the device and the base.

In some embodiments, it is possible to combine the use of two frequencies with the use of permanent periodic patterns, especially if the bandwidth of the pattern is not sufficient to resolve the modulo uncertainty of the first frequency.

Figure 5:
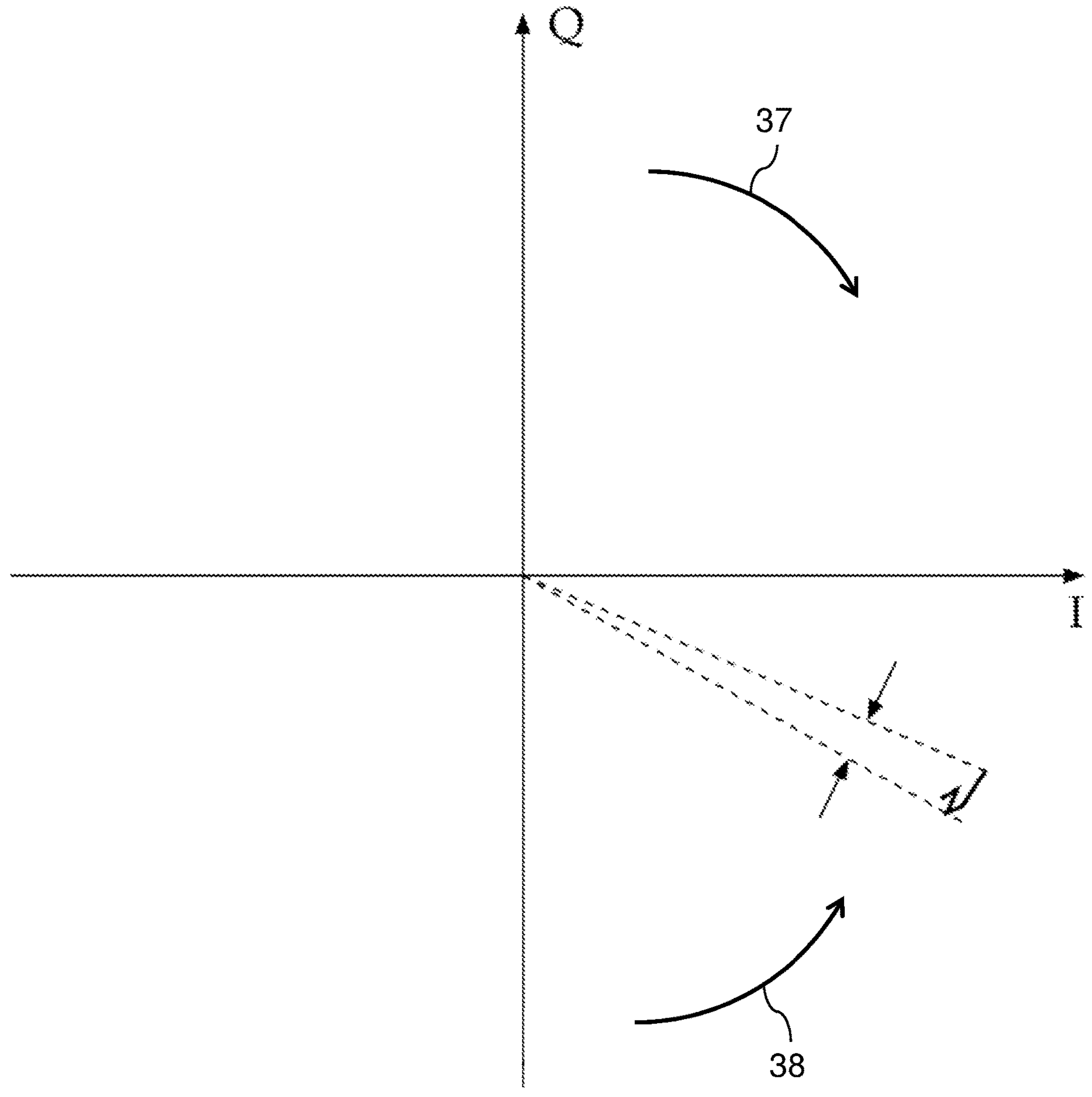
FIG. 5 shows a measurement example of the first embodiment when the frequencies of the device and the base are not perfectly equal.

Note that the different embodiments of the invention also operate well if the two oscillators do not have exactly the same frequency f. FIG. 5 shows an example of actual measurements between a device 10 and a base 12 when the frequency of their local oscillator is merely substantially equal, not exactly the same. Therefore, the phase between the two oscillators varies over time, as shown by the arrows 37 and 38 of the IQ points shown here in the complex plane for the device 10 and for the remote base 12. Even though this phase changes over time, it varies in opposite directions according to the point of view of the device 10, arrow 37, or of the remote base 12, arrow 38. Therefore, in accordance with the first embodiment, the combination of the two measurements through the sum of the phases at each instant produces a point in the complex phase plane theoretically fixed, here with a precision of 6.4° because of the measurement noise, which corresponds to 4*pi*d/lambda in accordance with equation (3). In the second embodiment, FIG. 3, it is sufficient to send the wave I=I2(t) and Q=Q2(t).

The turnover time thus produces a fixed phase which is easy to take into account.

In a degraded operating mode, where the device has only a very limited computing power, its position can be calculated in the bases using phases measured simultaneously by at least five surrounding bases. In this embodiment, the device emits a first signal that is received by several surrounding bases. Each of these bases sends, in its timeslot, the IQ point measured, but recognising the operation in degraded mode by the identifier sent by the first device, the signal returned is not measured by the device but by each of these surrounding bases. They can then combine the phases measured by each of the other bases, which makes it possible to determine the differential path of the electromagnetic waves of the device directly towards one base or via another base. As the bases know the distances which separate them, the differential distances measured makes it possible to determine the position of the device without it having to make a calculation. Its position can be made available by a communication network and therefore a longer or shorter latency period. This is therefore particularly suited to devices not requiring real-time information, for example the verification of the parking of a self-service vehicle.

In all these cases, the advantages of the utilisation of the invention comprise:

- the measurement is almost instantaneous;
- great spatial precision, for example less than a centimetre for a frequency of 2.4 GHZ, which is a free frequency band for this type of applications;
- the measurement can be made at the level of fixed bases (which is useful for the operators managing or using the infrastructure) or at the level of an onboard device 10 (which is useful for the mobile unit, especially if it is autonomous, since this avoids network latencies);
- there is no major technological breakthrough, merely an adaptation of existing systems, which facilitates the industrial development and limits the costs.

The present invention makes it possible to rapidly obtain, in a reliable and low-cost way, a centimetric position in the environment, in particular urban or indoor, e.g. in a station, by a mobile unit/infrastructure cooperation. It involves measuring the time of flight of an electromagnetic wave between fixed bases 12, referred to a reference, and a mobile device 10 built into the mobile unit. The measurement of the distance of the device 10 relative to each fixed base 12 is reliable and rapid, with a precision better than five centimetres (typically one centimetre).

An operation on the phase, transmission of the phase shift in a message, in FIG. 2, or the phase shift of the signal 31 in return, in FIG. 3, is carried out by the remote base 12 which responds for eliminating the determination of the distance of the time synchronisation between the clocks of the device 10 and of this base 12.

In practice, the device 10 must be able to identify each base 12 in relation to which the device measures its distance d, for determining the position of the device 10. Similarly, it is necessary to avoid downstream collisions between the signals 26 or 31. For these two reasons, the signals exchanged between the device 10 and each base 12 are structured as frames 42, 45 and 49, as shown in FIG. 6. The upstream frames 42 carry a message representing, for example:

- the frequency of the carrier 41;
- an identifier of the device;
- a request possibly asking for a response, possibly indicating the embodiment utilised; and
- possibly codes for error detection and/or correction.

Then the device 10 switches to a listening mode of operation.

Each remote base 12 is initially in listening mode. As described with reference to FIGS. 2 and 3, a first base 12 receives the frames 42 with a carrier 43 phase shifted relative to the carrier 41 because of the time of flight of the frames between the device 10 and this first base 12. This first base 12 responds to this message after a predefined time interval 44, in a timeslot assigned to it, then returns to listening mode. A second base 12 receives the frames 42 with a carrier 47 phase shifted relative to the carrier 41 because of the time of flight of the frames between the device 10 and this second base 12. This second base 12 responds to this message after a predefined time interval 48, in a timeslot assigned to it, then returns to listening mode.

The downstream frames 45 and 49 carry a message representing, for example:

- the frequency of the carrier 41;
- an identifier of the base 12;
- the response to the request, for example the phase 25;
- the identifier of the device 10 that sent the request; and
- possibly codes for error detection and/or correction.

Another advantage of communication via frames is that it makes it possible to measure the frame offsets, which resolves the uncertainty of the measurements of distances d at modulo roughly one half-wavelength depending on the embodiment, in particular at large distances d. The frame and the carrier can also advantageously be emitted at the same time by using the property of independence of the I and Q components of the device and bases, as shown above.

In some embodiments, the means for determining the distance of the device 10 with respect to a fixed base 12 is configured to determine the position of the base 12 by means of its identifier, for example because the device 10 holds a database of geographic positions of bases 12.

In some embodiments, the identifier of the base 12 comprises its geographic position. Therefore, the device 10 does not need to store an up-to-date database of the positions of the different bases 12 since these bases 12 notify it of their up-to-date positions. The device 10 is simplified and positioning is more reliable and faster.

Figure 7:
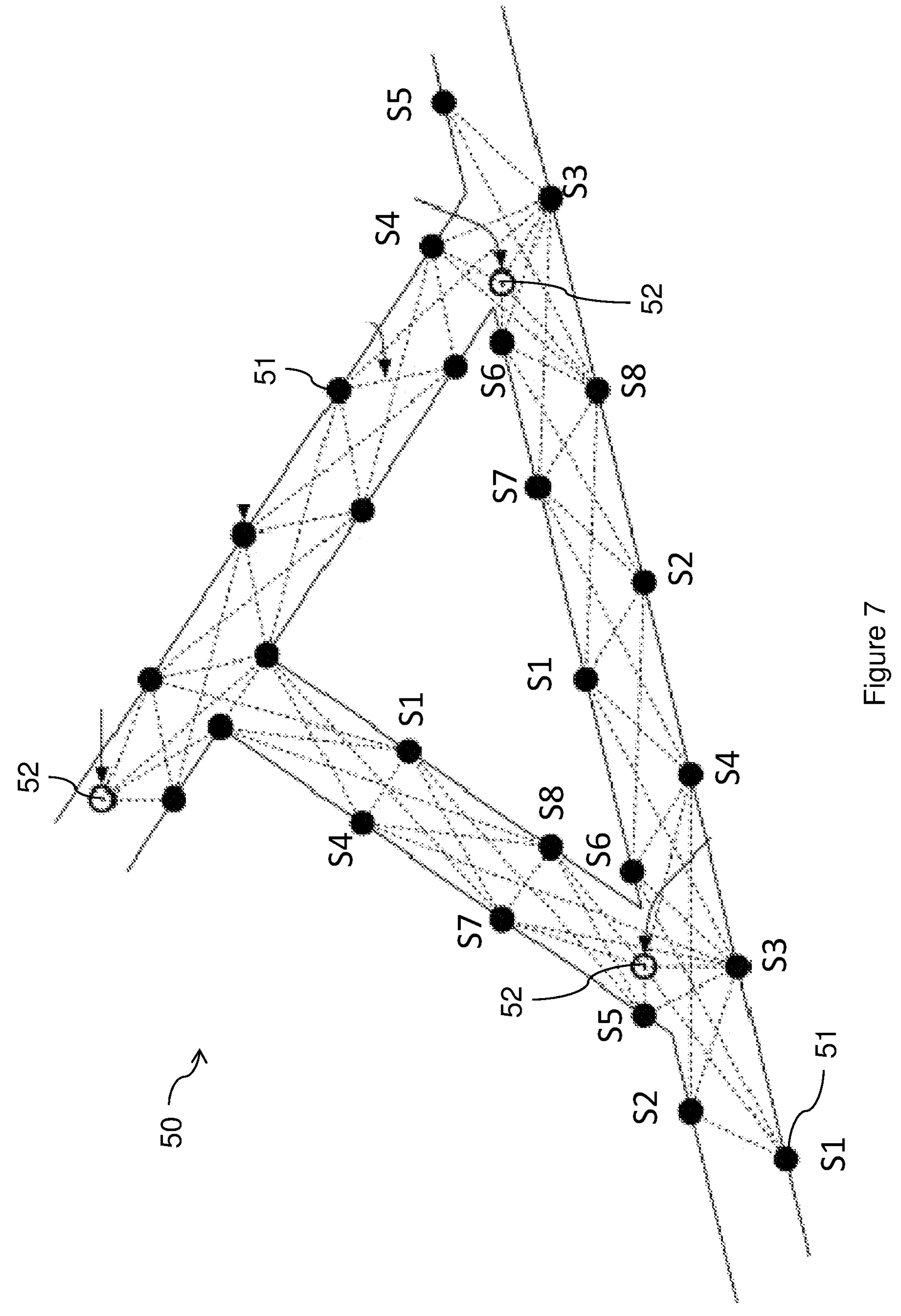
FIG. 7 represents, schematically, a layout of a network of fixed bases on a road network.

As shown in FIG. 7, the automatic measurement of the distances between bases 51, represented by black discs, and the knowledge of some cadastral points 52, represented by white discs, enables a rapid calibration, a check and a detection of incidents.

In fact, a precise positioning requires equally precise reference points.

The electronic circuits, for example the circuits 60 of the fixed bases 51 and onboard devices 10, can be entirely similar. Therefore, determining the distances between the fixed bases 51 and the mobile units that have a device 10 on board, is just as simple as determining the distances between the fixed bases 51. The distances between the fixed bases 51 can be measured regularly and any difference with respect to a previous situation is rapidly detected and known, a difference due, for example, to an accident or a malicious act to the mast which holds the fixed base 51. The network 50 of bases 51 can therefore react quickly by taking the corresponding fixed base 51 out of service or by recalculating its exact position. This introduces great robustness for this network 50. Also, since the distances between the bases 51 are known, that forms a dense network of distances. The absolute positioning of these points therefore requires at least three absolute reference points, for example produced by cadastral points 52 whose geographic coordinates are fully defined.

Note that a fixed device 51 is recognised by its identifier. To match this distance network with geographic points, during a calibration phase:

- a technician places a mobile base on a known geographic point, for example a cadastral point;
- the distance from surrounding bases to this known geographic point constrains the distance network to be linked to this known coordinate;
- the technician performs this operation at least twice with other known geographic points, preferably widely separated;
- a minimum of three geographic points is necessary to fully constrain the network of distances, using more geographic points enables redundancies that improve the overall precision of the network of fixed bases 51.

The calibration consists therefore of automatically building the network of interconnections between the fixed bases 51 and then of the addition by a technician of mobile bases positioned on cadastral points 52. With a few operations by a technician, and therefore a short period of time, it is therefore possible to completely constrain the network of distances 50.

The assignment of timeslots according to the distances between the fixed bases 51, which can be automated (see FIG. 7), sharply reduces the risk of collisions with second signals and downstream frames.

When more than two bases 51 are used, which is necessary to have a geographic point, one after another of the bases 51 takes the role of device and interrogates the surrounding bases 51. When the distances between this device 51 and sufficient bases 51 are known, this device 51 calculates its geographic position and makes this item of data available via a network connection that directly uses the microwave system of the bases (it is preferably Wi-Fi compatible in the 2.4 GHz band) or via an additional mobile telephone connection, for example.

Each base 51 can also send the raw distance data to a central computer system (not shown), which determines the geographic position of each base of the network of bases. The distance to at least four reference bases is needed to determine a geographic position. This is because the distance to one reference base defines a sphere of possible positions. With two distances, the intersection of two spheres limits the possible positions to a circle. With three distances, only two possible points remain for the intersection of the three spheres. The fourth distance resolves all ambiguity. In addition, to improve the precision of the intersection between the spheres it is preferable that, for the four bases considered, the fixed bases are not all aligned.

In the case of autonomous mobile units, the mobile device 10 is autonomous so that it can have direct access to the distances and therefore calculate its position with no additional latency period. The precision obtained for the phase is less than 10°, 6.4° in the example of FIG. 5, which makes it possible to estimate the distance with a precision of three to four millimetres for a frequency of 2.4 GHz with a range of five metres by using two frequencies separated by 60 MHz, for example 2.42 GHZ and 2.48 GHz. Beyond this range of five metres, frame delay detection is used, which only requires a precision of about 15 ns, or a bandwidth of 60 MHz which is covered directly by the converters of each device.

Therefore:

- the calibration is simple to implement, quick and is not labour intensive. It is therefore inexpensive;
- the regular measurement of the network of distances makes it possible to check the device and therefore verify at all times that it is operational, detect malfunctions and correct errors as necessary.

In some embodiments, for the assignment of time intervals or timeslots to the fixed bases 51, their geographic position is taken into account, such that two fixed bases 51 that exchange signals with the same fixed base 51 do not have the same time interval assigned to them and to the same fixed base. In FIG. 7, the references S "X" indicate the timeslot numbers "X" between 1 and 8 assigned in this way (only a portion of the timeslots assigned to the bases is shown). Of course, if one has a greater number of timeslots, for example 16, one can extend the constraint to more than one range of communication between bases. For example, two fixed bases 51 that, either directly or through an intermediate fixed base, exchange signals with the same fixed base 51 do not have the same time interval assigned to them, to the same fixed base and to the intermediate bases.

Figure 8:
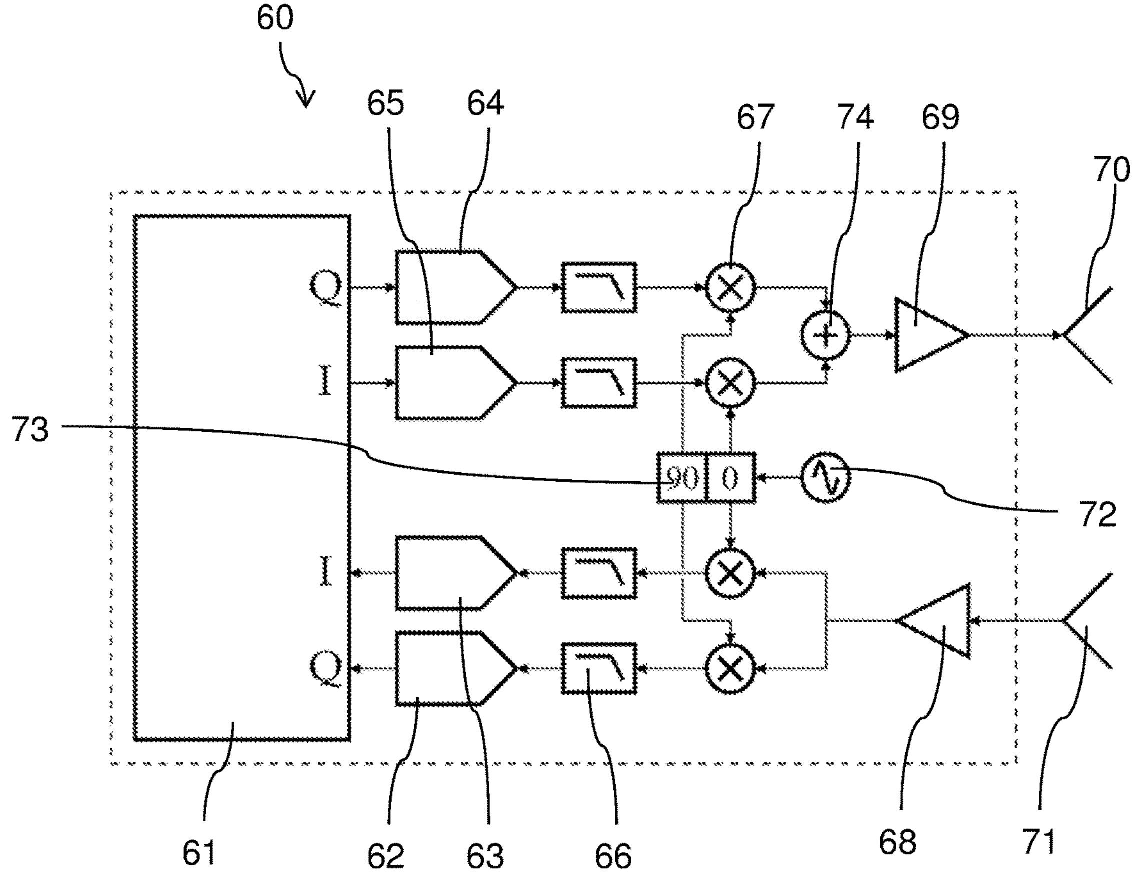
FIG. 8 represents, schematically, an electronic circuit implementing the invention in a device or in a base.

FIG. 8 shows an example of realisation of an electronic circuit of a device or base that is the subject of the invention. This circuit comprises a microwave IQ transmission/reception headend operating, for example, in the 2.4 GHZ ISM band. This transmission/reception headend comprises an oscillator, also called clock, 72, a quarter-wavelength phase shifter 73, low-pass filters 66, mixers 67, an adder 74, and amplifiers 68 and 69. A transmitting antenna 70 and a receiving antenna 71 complete the analog portion. The digital portion comprises digital-analog converters 64 and 65, analog-digital converters 62 and 63 and a calculation unit 61 to handle the signals and the communication between the devices and the bases, and between the bases. The calculation unit 61 reads the IQ points from the reception module, performs calculations and writes IQ points in the emission module. The calculation unit 61 also comprises memories (not shown) of programs and data, in particular of patterns described below.

In one implementation example of this circuit, the microwave headend consists of an ADRF6720 circuit (registered trademark of a wideband (700 MHz to 3 GHZ) quadrature modulator incorporating a fractional (PLL/VCO) oscillator) for the emission and an ADRF6820 (registered trademark of a wideband (695 MHz to 2700 MHZ) quadrature modulator incorporating a fractional (PLL/VCO) oscillator) circuit for the reception. These two circuits use the same local oscillator 72 for the emission and reception. Of course, any other circuit allowing access to IQ signals at least after demodulation or digitisation can be used. Also, a battery or mains electrical power source (not shown) is needed for the circuit to operate. It is noted that this device is completely conventional, the IQ signals are simply made available to the calculation unit 61 for carrying out the operations necessary to determine the phase and therefore the distance, and then the position.

In a single phase of communication between two circuits 60 A (of a device) and B (of a base) to determine the distance that separates them:

- circuit B is in listening mode and circuit A is in emission mode;
- circuit A, in emission mode, emits a fixed frequency for a short time, typically one microsecond, then a message, typically an order, the initiation of a distance measurement for example, and an item of data, the identifier of circuit A, for example;
- circuit B, in listening mode, receives the signal, records the (I,Q) points and decodes the message;
- in the case of a distance measurement according to the embodiment illustrated in FIG. 3, circuit B, which was in listening mode, switches to emission mode then sends a signal comprising the (I,Q) points previously received as well as a response message, for example the identifier of circuit B;
- simultaneously, circuit A, which was in emission mode, switches to listening mode and waits for the response;
- when circuit A receives the response, it records the (I,Q) points of the signal received, and determines the phase then the distance separating the circuits A and B, modulo the wavelength;
- to resolve the wavelength modulo ambiguity, the procedure then starts again with another frequency f or a frame offset is measured;
- if at least three distances with three circuits B have been obtained in this way, circuit A determines its geographic position.

In circuit B, the calculation unit 61 forms a means for measuring a first phase shift between the oscillating signal from the first clock of circuit A in the signal 22, on the one hand, and the oscillating signal from the second clock of circuit B, on the other hand.

In circuit A, the calculation unit 61 forms a means for measuring a second phase shift between the oscillating signal from the first clock of circuit A and the oscillating signal from the second clock of circuit B, and a means for determining the distance of the device comprising circuit A relative to the base comprising circuit B, based on the first phase shift and the second phase shift.

Figure 9:
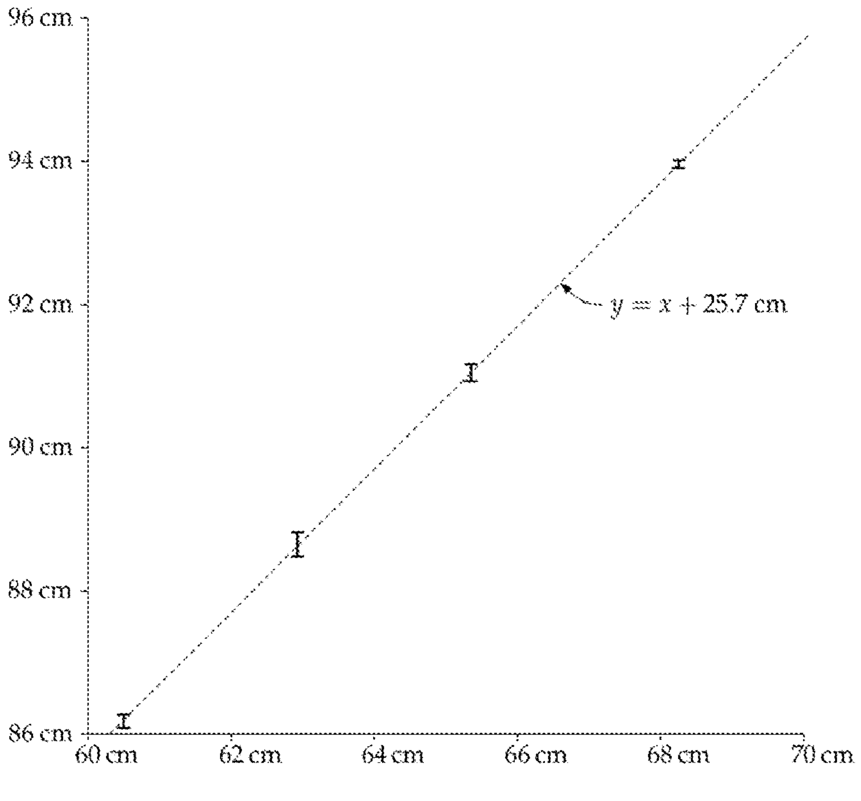
FIG. 9 shows a graph of the estimate of the distance in an embodiment of the device.

FIG. 9 shows a graph of experimental measurements for different distances with the error bars for a device and a base comprising the circuits indicated previously and using the frequencies 2.4 GHz and 2.46 GHz to resolve the modulo uncertainty. The y-axis of the graph corresponds to the actual distance, and the x-axis corresponds to the distance calculated based on the times of flight arising from the two frequencies. In this example, the relation between the calculated distance y and the actual distance x is y=x+25.7 centimetres.

The systematic offset of 25.7 centimetres corresponds to the time taken by the components to amplify and demodulate the signal. As this length of time is fixed, it is easy to calibrate it and deduct it systematically. Note that the turnaround time has no influence on the determination of the distance if the frequencies of the device and the base are equal. In the case where these frequencies are not perfectly equal (FIG. 5), the acquisition of the signal (22 on the remote base side, and 27 or 33 on the device side) must be done with a similar controlled length of time between the instant when the signal arrives at the antenna and the instant when it is sampled by the calculation unit. The precision of the estimate of the distance in FIG. 9 is between 1 and 3.25 millimetres, depending on the distance.

Figure 10:
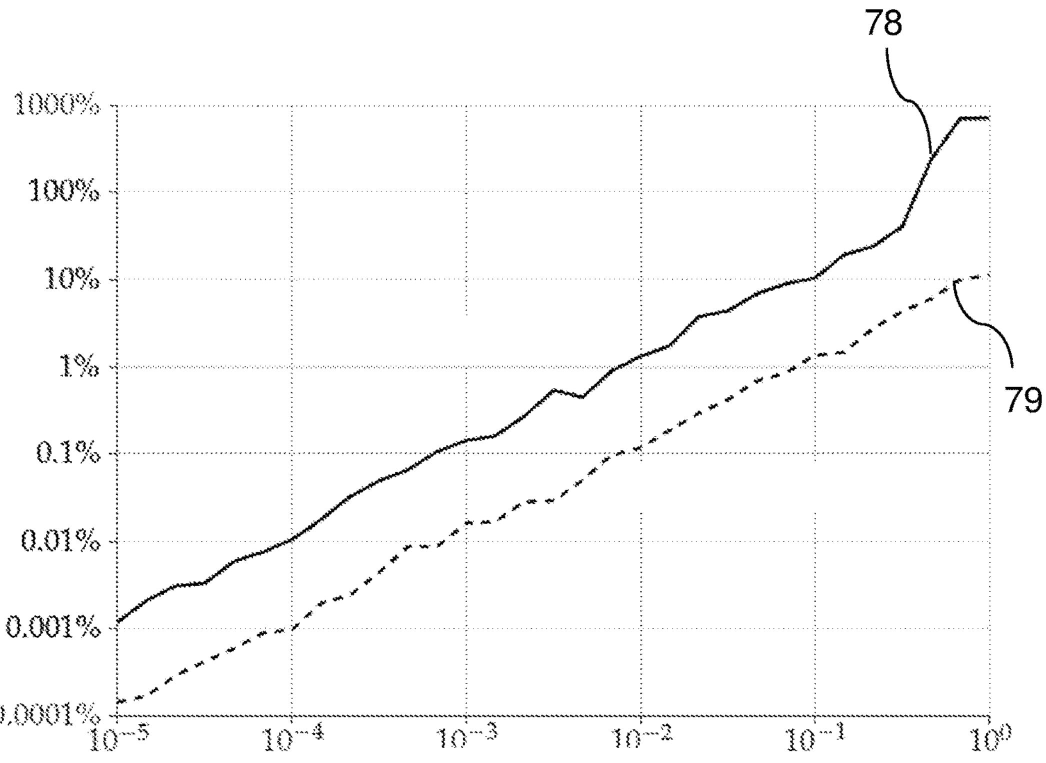
FIG. 10 represents an error in estimating the offset in points of two 64-point permanent periodic patterns as a function of the level of noise relative to the signal, calculated over one period of the pattern and over 100 periods of the pattern.

FIG. 10 shows the error in estimating the offset in points of two 64-point permanent periodic pattern as a function of the level of noise relative to the signal, calculated over one period of the pattern, error 78, and over 100 periods of the pattern, error 79. This error is measured by fast Fourier transform (FFT), enabling better positioning precision than a correlation. In this case of using a permanent periodic pattern to increase the range of available distances, FIG. 10 thus shows the influence of the noise for an estimate of the offset when the permanent periodic pattern consists of 64 points, this 64-point pattern being calculated using the Fourier transform of a 64-point spectrum, whose frequencies 31 have constant amplitude and random phase. Here the sampling of the pattern is at 20 MHz and the error in estimating the offset is less than 1% of the sampling time for a noise of 0.63% of the signal when a single period of the permanent periodic pattern is considered, and 6.3% of the signal when 100 periods of the permanent periodic signal are considered. The error therefore increases in proportion to the level of noise relative to the signal, and decreases in proportion to the square root of the number of periods considered.

Figure 11:
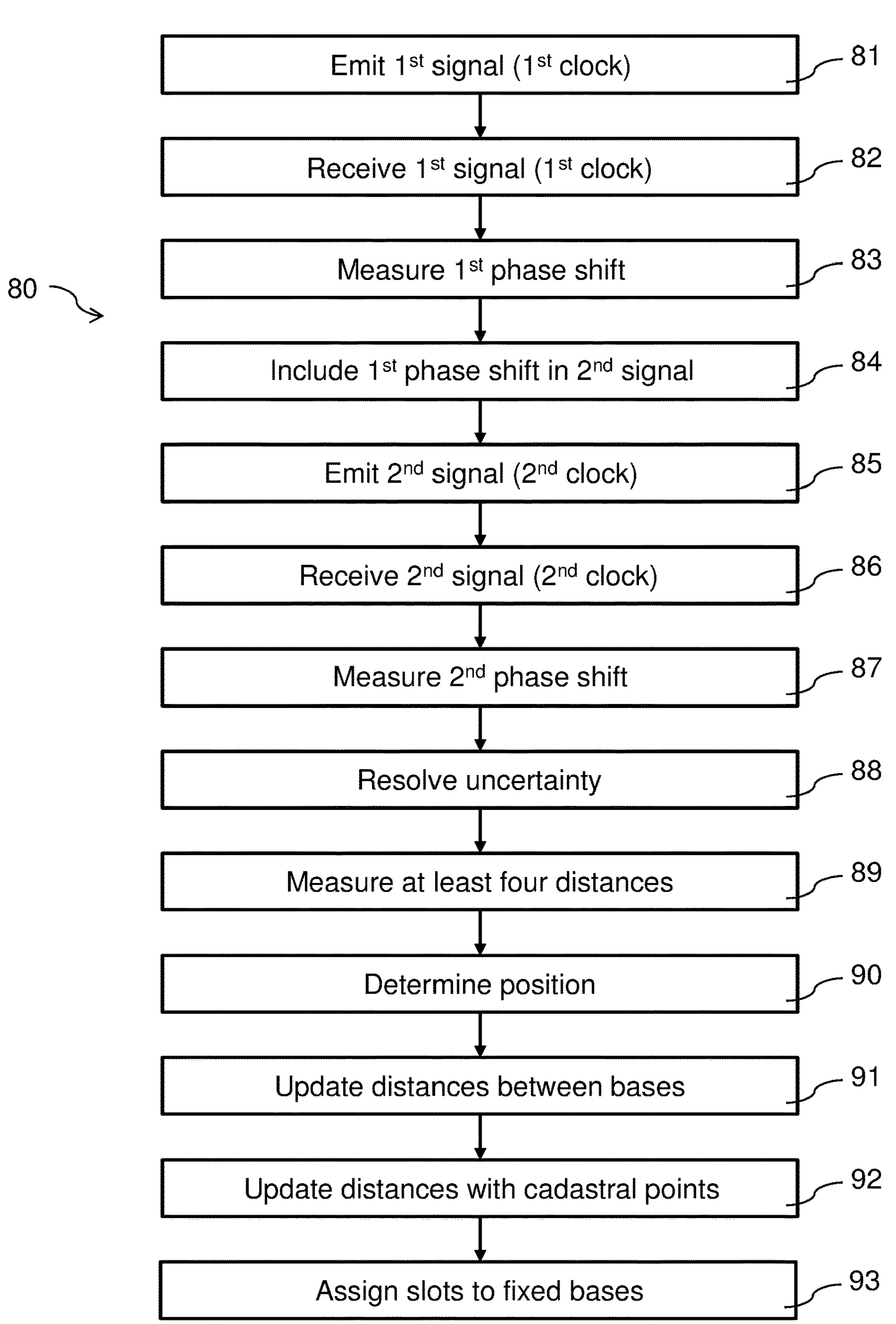
FIG. 11 represents, schematically and in the form of a logic diagram, steps in a particular embodiment of the method that is the subject of the invention.

FIG. 11 describes the steps of an embodiment 80 of the method that is the subject of the invention. During a step 81, circuit A emits a first signal 21. During a step 82, circuit B receives the signal 22. During a step 83, circuit B determines the phase shift between the signal 22 and the signal of its clock 72. During a step 84, circuit B includes the first phase shift in the response signal 26 or 31, depending on the modes of operation (see FIGS. 2 and 3). During a step 85, circuit B emits the response signal. During a step 86, circuit A receives the response signal. During a step 87, circuit A measures the phase shift between the signal received and its clock 72. Optionally, during a step 88, circuit A performs a resolution of the distance uncertainty. During a step 89, circuit A determines whether it has obtained at least four distances with four different bases. If yes, during a step 90 circuit A accesses the position of bases in relation to which it has obtained its distance, and determines its geographic position. It can be seen that this position can also be dependent on information received from an inertial unit attached to circuit A and can use algorithms to determine the most probable position, in the case where at least five distances with fixed bases have been obtained.

During a step 91, for example during low traffic periods, in particular night-time, or on detection of a shock revealed by an inertial sensor (not shown) included in a base and which may be the source of the unexpected movement of this base, the circuits B of the bases carry out, with each other, steps 81 to 90 to update their respective positions. During a step 92, periodic, for example yearly, the circuits B of the bases carry out, with each other and with mobile bases mobiles positioned on cadastral points, steps 81 to 90 to update their respective positions. During a step 93, time intervals (timeslots) are assigned to the fixed bases according to their respective positions, to reduce the risks of downstream collisions.

Figure 12:
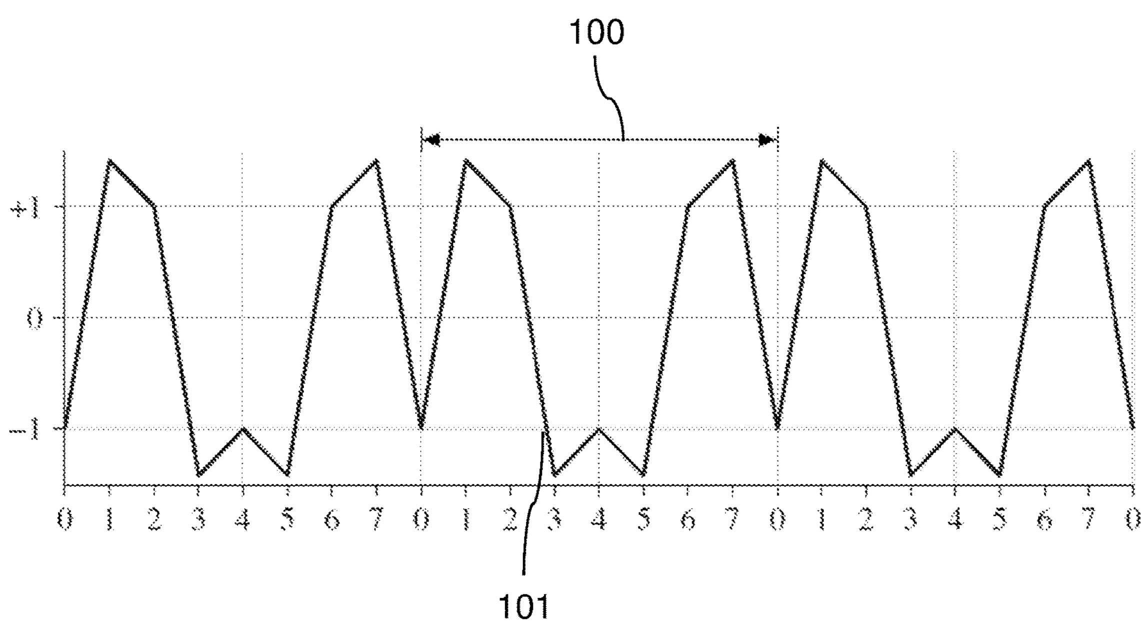
FIG. 12 is a timeline of the periodic repetition of a pattern.

FIG. 12 shows an example of a pattern 101 comprising eight points, repeated three times, with no time interval between the repetitions.

For its positioning, the device 10 sends a request to the bases 12, this request preferably comprising at least one complete periodic pattern 101, for example between one and two periods 100 of this pattern 101. A request comprising more than one complete periodic pattern 101 is preferable. This is because, on reception, the sampling is completely asynchronous and it is therefore possible to lose one point 103 of the signal sent. By sending at least one point 103 of the pattern 101 as well as a complete pattern 101, this ensures that a complete pattern 101 is acquired. However, the acquisition of a complete period 100 enables more precise time-shift calculations to be made than in the case of a simple correlation.

In some embodiments, the period of the counters is more than double the maximum time of flight corresponding to a predefined maximum distance between the device 10 and a base 12 likely to respond to a request from this device 10.

Note that, to satisfy this condition, which avoids a modulo of half the period of the counter multiplied by the propagation speed of the signals in the distance measurement, fixed-length or variable-length patterns 101 can be provided, for example by supplementing patterns stored in memory by an identical pattern segment (not shown) for all the devices 10 and all the bases 12.

The device 10 and every base 12 each comprise a counter that cyclically scans n positions of a pointer pointing to memory areas where values of successive points of a pattern can be recorded and read. These pointers are reset to zero when the last sample or point of the pattern has been read. The period for browsing the n positions of the pointer is substantially equal for the device 10 and the bases 12, without these counters and pointers being synchronised.

Different embodiments of the invention utilising these patterns 101 are described below. In the embodiments referenced by A/and B/below, it is not necessary that the base 12 has the same repeating pattern as the device 10, since the base 12 behaves like a repeater by re-emitting the pattern 101 that it receives.

A/In some embodiments, on receiving the permanent periodic pattern emitted by a device 10, a base 12 records it over at least one period and then re-emits it, in the order of receipt, to the device 10, after a given integer number of periods 100 of the periodic pattern 101.

This integer number depends on the turnaround time and therefore on the calculation speed of the base 12, and also on the timeslots available for the response (several bases can respond to a single request). Therefore, in each period 100, it is as if the counter has gone back to the starting point, the value of the given number not being important, provided it is an integer. This time before re-emission must nevertheless be compatible with the frequency drifts, e.g. for one second with a frequency of 20 MHz and a 64-point pattern, the maximum integer number is 312500. The integer number used is preferably the number that corresponds to the first timeslot available.

When the device 10 receives the pattern re-emitted by the base 12, it compares (for example, correlation or Fourier transform) this pattern with its own permanent periodic pattern and deduces from this the time shift between the two patterns, emitted and received, which time shift is proportional to the distance between the device 10 and the base 12 and inversely proportional to the speed of the electromagnetic waves.

Figure 15:
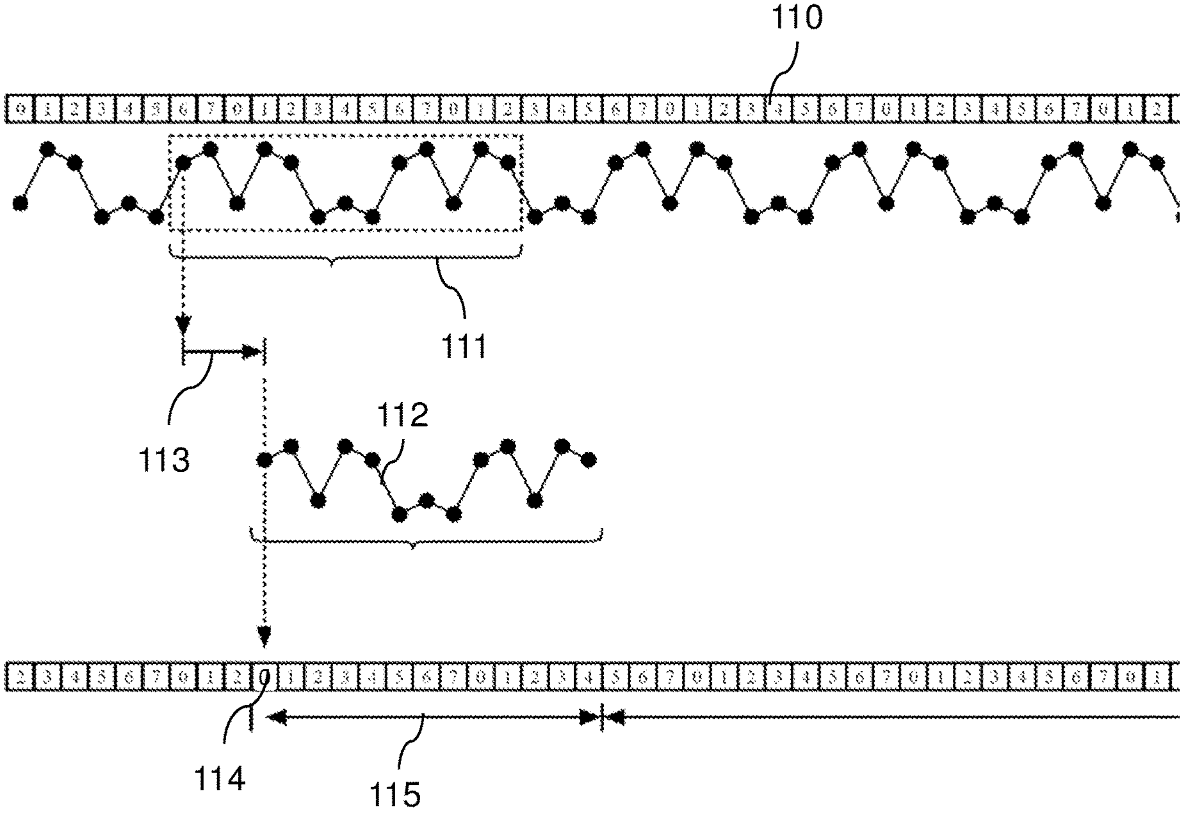
FIG. 15 is a timeline of the transmission and reception of a request comprising between one and two repetitions of a pattern.
Figure 16:
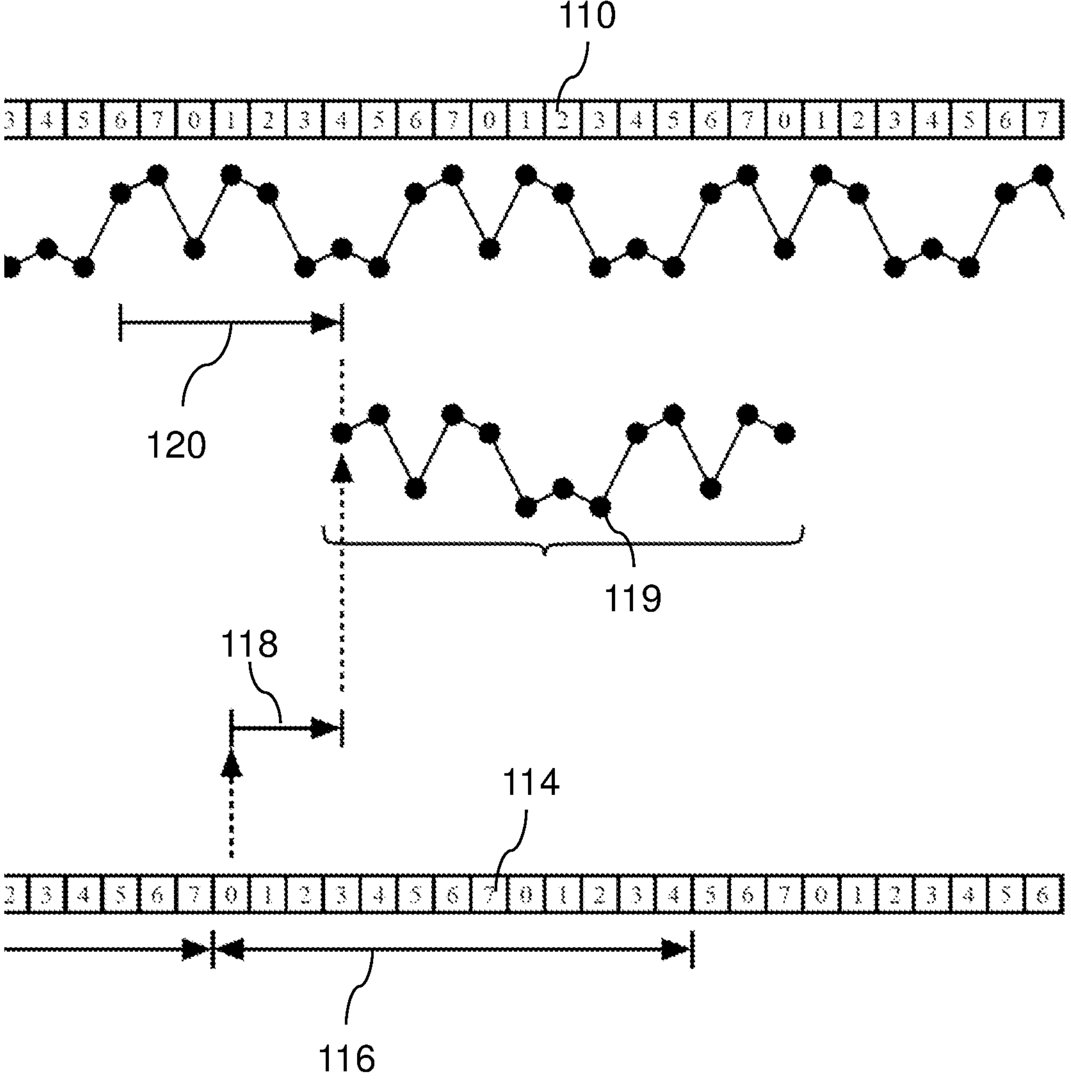
FIG. 16 is a timeline of the transmission and reception of a response to the request illustrated in 15.

B/In some embodiments, on receiving the permanent periodic pattern emitted by a device 10, a base 12 records it over at least one whole period 100, and then re-emits it, in the order of receipt, from an $n^{th}$ sample, and, after the re-emission of the last sample received, it is the first sample received that is re-emitted up to the $n-1^{th}$. The re-emission is therefore made after an integer number and a fraction of a period of the periodic pattern, this fraction corresponding to the ratio of the number n to the number of samples in a period 100 of the permanent periodic pattern 101, for example eight in the pattern 101 shown in FIG. 12. FIGS. 15 and 16 correspond to these embodiments.

The utilisation of the fraction of the period avoids responding at an instant given by an integer number of the period of the pattern 101. For example, if a response timeslot has not been well defined with regard to the turnaround time of the base 12, it can adjust the time of its response by waiting not for an integer number of the period but simply for a fraction of this number.

When the device 10 receives the pattern re-emitted by the base 12, it compares this pattern with its own permanent periodic pattern 101 and deduces from this the time shift between the two patterns, emitted and received, which time shift is proportional to the distance between the device 10 and the base 12 and inversely proportional to the speed of the electromagnetic waves.

C/In some embodiments, on receiving the permanent periodic pattern emitted by a device 10, a base 12 compares this received pattern with its own permanent periodic pattern to deduce from this a first time shift between the device and the base. The base 12 then emits an item of information representative of this first time shift, as digital data, to the device 10, with at least one period of the permanent periodic pattern 101 of the base 12. On receiving the permanent periodic pattern emitted by the base 12, the device 10 compares this received pattern with its own permanent periodic pattern to deduce from this a second time shift. By adding these two time shifts, the first being read in the data emitted, to eliminate the absolute synchronisation between the device 10 and the base 12, the device deduces the distance between the device 10 and the base 12.

Figure 13:
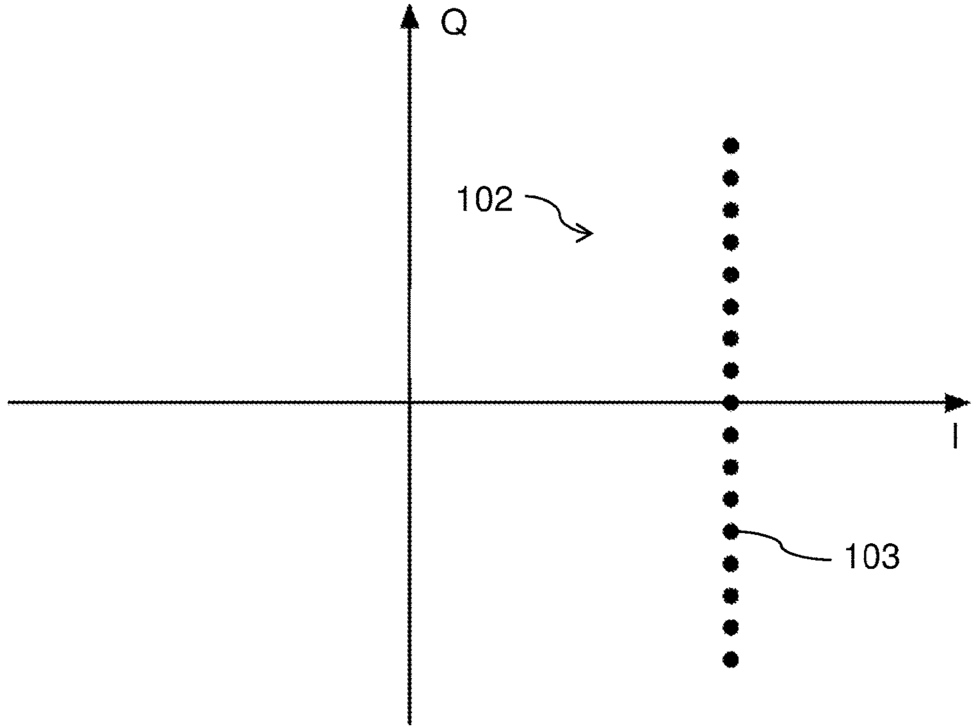
FIG. 13 represents, in the IQ plane, an emitted signal representative of a pattern.

D/In some embodiments, on receiving the permanent periodic pattern emitted by the device 10, the base 12 records it in a memory and then reads it by means of the pointer. On reading a point of the pattern 101, the device 10 emits it to the base 12, and the base 12 emits it to the device 10. At the time the device 10 sends at least one period of the permanent periodic pattern, the device sets its pointer to zero, reads the data by means of its pointer and makes them available to its IQ emission system, for example on the Q channel, the I channel remaining constant for a phase measurement, as shown in FIG. 13.

At the time the base 12 detects the reception of a request, it stores the value of its own pointer at the time of receiving the first IQ sample, then re-emits them cyclically beginning with the sample corresponding to the value of the pointer at the time of the re-emission. When the device 10 detects the signal re-emitted by the base 12, it can therefore detect the phase by the rotation of the IQ plane (FIG. 14), and then, once realigned, compare the pattern sent with its own permanent periodic pattern and deduce from this the time shift between the two patterns 101. Measuring the phase shift in the IQ plane makes it possible to improve the precision of the distance estimated by the pattern, in particular in the case of significant noise in the microwave communications.

In each of the embodiments described above, the sequence of steps is, in a variant, repeated in order to use, simultaneously or successively, two separate communication channels, in particular when the communication noise is high.

FIG. 12 shows a repetition period 100 of a pattern 101. A clock in each device and in each base performs a synchronisation of a pointer to a pattern memory for browsing this pattern 101 in the same period 100.

FIG. 13 shows, in the IQ plane, an emitted signal 102 representative of a pattern. The different possible values of the pattern are shown by the points 103.

Figure 14:
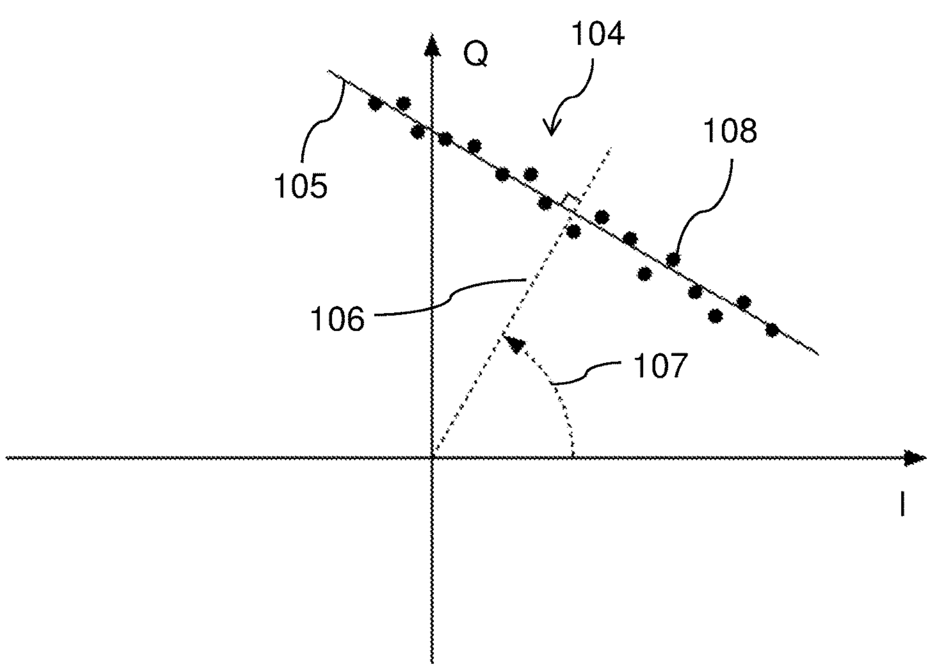
FIG. 14 represents, in the IQ plane, a received signal corresponding to the emitted signal illustrated in FIG. 13.

FIG. 14 shows, in the IQ plane, a received signal 104 corresponding to the emitted signal 102. This received signal 104 comprises points 108 for each point 103 of the emitted pattern 102. The receiver of this signal, base for the request and device for the response to the request, determines a linear fit 105 of the points received, then a straight line 106 passing through the origin of the IQ plane and perpendicular to the linear fit line 105, and then the phase 107 of the line 106. The difference between the phase 107 on reception and the phase (zero in the example in FIG. 13) corresponds to the phase shift of the signal between its emission and its reception, measured by means of pointers themselves phase-shifted. The utilisation of the invention makes it possible to eliminate this phase-shifting of the pointers to measure the phase shift solely due to the time of flight (acronym "TOF") of the outward (from the device to the base) and return (from the base to the device) signals.

Therefore, when the emitter (which can be the device 10 or the base 12, depending on the direction of the communication) sends a constant on the I channel and at least one period of its permanent periodic pattern on the Q channel, in the IQ diagram this results in a series of points aligned vertically since the x-axis I is a constant while the y-axis Q changes. During the emission, the delay in the propagation turns the IQ plane through a full rotation per wavelength. At the time of the reception, the IQ points received are therefore aligned, in the IQ plane of the receiver, but on a line inclined from the vertical with an angle that corresponds to the fraction of the wavelength separating the emitter from the receiver. A simple way of determining the information and therefore of estimating, for example after a regression a linear fit 105, the slope of the line on which the IQ points received are aligned. From this line 105, one extrapolates the distance to the origin of the IQ plane corresponding to the constant I sent, and which gives a reference point on the line, and the angle of rotation whose cotangent is simply the slope of the line.

The phase shift obtained in this way provides fine-scale information about the distance between the emitter and the receiver.

Of course, it is not necessary for the value carried by the I channel to be constant and the pattern 101 to be carried by the Q channel. The signal emitted can, for example, be phase-shifted on emission, as shown with reference to FIG. 14, knowledge of the phase on emission being sufficient for the device to determine the total phase shift due to the time of flight of the outward and return signals. Measuring the phase over the entire pattern after linear fitting 105, makes it possible to improve the precision of the distance estimated, in particular when the noise is too high.

FIGS. 15 and 16 show a complete round-trip sequence for a pattern with eight samples. The optional use of the carrier phase-shift measurement to increase the precision of the determination of distance is not detailed again.

FIG. 15 shows the transmission, i.e. the emission (at the top) and the reception (at the bottom) of a request signal modulated by a pattern 101. The position 110 of the pointer 10 is shown in the highest line. This pointer cyclically scans the eight values (indexed 0 to 7) of the pattern 101 stored in memory. When the signal is emitted, the values of the pattern 101 read during at least one period 100, at the memory positions indicated by the pointer for modulating the signal emitted 111. Because of the distance between the device 10 and the base 12, the signal 112 received by the base 12 is offset in time by a delay 113, relative to the signal emitted. It is assumed, in the rest of the description of FIG. 15, that the base 12 sets its pointer to zero on reception of the first sample representative of a point of the pattern carried by the signal received 112, as shown by the pointer value 114. Of course, as described with reference to FIG. 16, it is not necessary for the pointer to be reset to zero. For example, the position of the pointer on reception of the first sample can be stored by the base 12 and be used as the starting position for sending the pattern to the device.

The length of time 115 is the time for sampling the signal received 112 and storing the pattern values it carries.

FIG. 16 shows the transmission, i.e. the emission (at the bottom) and the reception (at the top) of a response signal 119 responding to the request 112 shown in FIG. 15.

The base 12 begins the emission of a pattern after an integer number of periods 100, after receiving the first sample of the signal received 112, therefore when the pointer 114 of the base, in the bottom of FIG. 16, returns to:

- the value "0" if this pointer was reset to zero on reception of this first sample of the pattern; or
- the value this pointer had on reception of this first sample.

The points of the pattern 111, during at least one period 100, are emitted by the base 12 to the device 10. Because of the distance between base 12 and the device 10, the signal 119 received by the device is offset in time by a delay 118, equal to the delay 113 relative to the signal emitted by the base. By measuring the time shift between the pattern read with the pointer 110 of the device 10 and the pattern 119 received from the base 12, the device 10 determines the sum of the times of flight of the outward and return signals, and can deduce from this the distance between the device 10 and the base 12.

Note that the pattern emitted periodically does not need to be common to all the devices 10 and all the bases 12, nor to be permanent beyond the time for determining the distance between the device 10 and the base 12.

In particular, in the embodiments A and B, it is not necessary for the pattern to be known by the base 12 that is used as a repeater.

However, the time between two points of a pattern 101 must be known by the base 12 so that the samples of the signals received correspond to these points.

The points of the pattern pointed to by the counter of the device 10 must be known by the base 12 if it carries out an offset or phase-shift measurement.

As can be seen from reading the description above, a system 9 for positioning a device 10 comprises this device 10 and a plurality of fixed bases 12. The device 10 comprises an emitter configured to emit a request comprising at least one pattern of points whose values are read with the pointer of the device browsing the positions of a pattern memory, the emitter of the device amplitude and/or phase modulating a carrier with the values of points of the pattern read successively.

Each base 12 comprises an emitter configured to respond to the request with a response that depends on the embodiments A to D described above.

In the embodiments A and B, the response repeats the pattern received by the base 12 from the device 10, the pointer of the base browsing memory positions to enter there the values of pattern points received, then browsing these memory positions to read there the values of pattern points to be emitted, each point of the pattern therefore being temporarily offset, relative to the time of its reception by the base, by a multiple of times the period of the counter of the base.

In the embodiment C, the response is representative of a first pattern time shift, measured by the base 12, between the pattern received and an identical pattern stored in the memory of the base 12, whose values are browsed by the pointer of the base 12. This first time shift is, for example, inserted into the data accompanying the pattern emitted, in a frame forming the response. The values of the points of a response pattern are read successively in memory positions browsed by the pointer of the base, from a position known by the device.

The emitter of the base 12 also amplitude and/or phase modulates a carrier with the values of points of the pattern read successively.

The device 10 also comprises:

- a means 61 for measuring a second temporal pattern offset between the values of pattern points received in each response and the values stored in the memory of the device 10 in the positions browsed successively by the pointer of the device 10.
- a means 61 for determining the distance between the device and each base as a function, respectively, of:

In the embodiments A and B, the total pattern offset between the pattern initially emitted by the device 10 in the request and the pattern repeated by the base 12 and received by the device 10 from this base 12.

In the embodiment C, the second pattern offset measured by the device 10 and the first pattern offset measured by the base 12.

The device 10 also comprises a means 61 for determining the position of the device as a function of a known position of each fixed base having responded and of the distance relative to each of these bases, determined by the determination means.

The precision of the positioning system based solely on the pattern offset measurements is twice the length of time between the emission of two points of a pattern, multiplied by the propagation speed of the signal.

In some preferred embodiments, the device 10 comprises a means for measuring the phase shift of the carrier of a signal received relative to the phase of a sine-wave signal generated by a clock of the device 10. If a base 12 comprises a means for measuring the pattern offset (embodiments C), this base 12 preferably also comprises a means for measuring the phase shift of the carrier of a signal received from the device relative to the phase of a sine-wave signal generated by a clock of the device 12.

This phase shift can be measured as described with reference to FIGS. 1 to 11.

The means for determining the distance of the device 10 adds the total phase shift measured for a signal round-trip to the total phase shift measured for this round-trip, for determining the distance from the device to each base.

As described above, in some embodiments, the signal emitted by the device 10 and by each base 12 is in IQ quadrature. For at least one predefined phase shift of the carrier of this signal, the signal on the I channel is constant and the signal on the Q channel carries the amplitude modulation of the pattern emitted by the device. Preferably, as shown in FIG. 13, the predefined phase shift is zero.

Premium, to measure the first and second offsets, the base and the device comprise a means for performing a linear fit of the points of the pattern received in the IQ plane. The measured phase shift is therefore equal to the difference between the angle between the vertical in this plane and the straight line obtained by the linear fitting; and this predefined phase shift (zero in the case shown in FIG. 13).

The measured offset used for measuring the distance between the device and the base is therefore equal to the pattern offset added to the phase shift measured in this way.

In some embodiments:

c) each base comprises a means for performing a linear fit of the points of the pattern received in the IQ plane, and a means for measuring the phase shift, this measured phase shift being equal to the difference between the angle between the vertical in this plane and the straight line obtained by the linear fitting; and this predefined phase shift;

the emitter of each base being configured to emit a negative phase-shifted IQ signal, relative to the signal received, of twice the phase shift measured so that the phase of the signal emitted by the base is in phase with the signal emitted by the device;

d) the device comprises a means for performing a linear fit of the points of the pattern received in the IQ plane, and a means for measuring the phase shift, this measured phase shift being equal to the difference between the angle between the vertical in this plane and the straight line obtained by the linear fitting; and this predefined phase shift;

the total offset utilised by the device for measuring the difference being the sum of the total pattern offset added to the phase shift measured by the measurement means of the device.

Thanks to each of these provisions, the precision of the positioning system is double the capacity to discriminate a phase shift of a plurality of n colinear pattern points in the IQ plane, multiplied by the propagation speed of the signal. Because of the plurality of n points in the pattern, this precision is even greater than the precision obtained by the phase shift measurement of a simple sinusoidal signal.

In some embodiments, the patterns emitted by all the devices and by all the bases are identical. Thus, implementation of the invention is made easier at the level of the means for measuring a temporal pattern offset.

In some embodiments, the patterns emitted by at least two different devices are different, the signal emitted by each device comprising data identifying or representing the pattern emitted by this device. Therefore, a base can identify the device, or the device itself can identify its own pattern, for measuring a temporal pattern offset.

In some embodiments, the patterns emitted by at least two different bases are different, the signal emitted by each base comprising data identifying or representing the pattern emitted by this base. The device can therefore identify each base with the pattern it receives.

In some embodiments, each signal emitted by a base comprises an identifier of this base, the determination means of the device being configured to determine the position of this base by means of its identifier.

In some embodiments, the identifier of the base comprises its geographic position.

According to a second aspect, the present invention envisions a device of a system that is the subject of the invention.

According to a third aspect, the present invention envisions a base of a system that is the subject of the invention.

In some particular embodiments of this base, this base is configured to behave like a device towards other bases to verify its positioning, the emitter being configured to emit a displacement message if the position determined is different from a previously saved position of this base.

In this way, the bases can verify and, if necessary, update their cadastral positions.

The Advantages are that:

the geographic calibration of the network of distances between the bases is simple to implement, quick and is not labour intensive. It is therefore inexpensive;

the regular measurement of the network of distances makes it possible to check and therefore verify at all times that it is operational, detect malfunctions and quickly correct errors.

Figure 17:
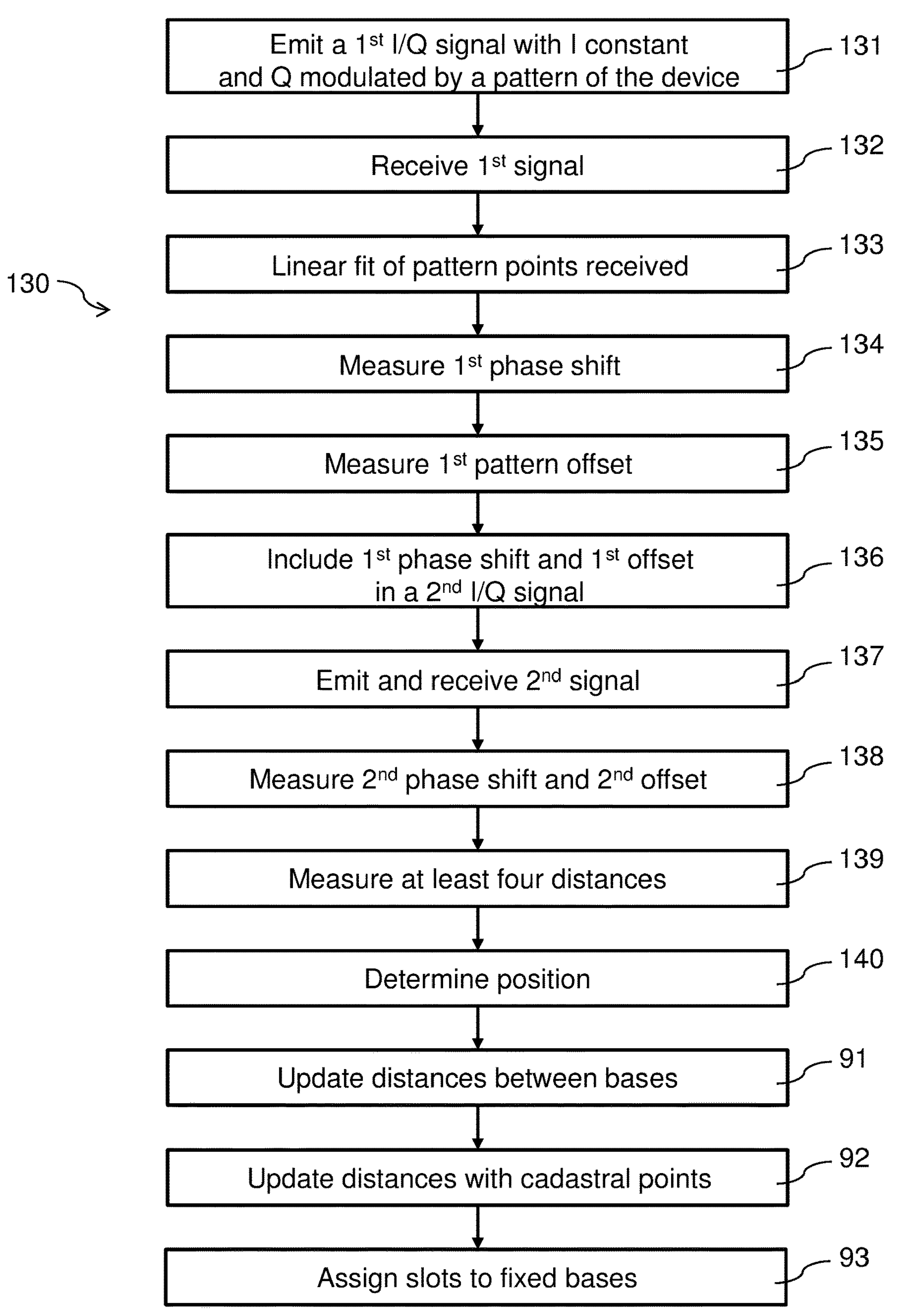
FIG. 17 represents, in the form of a logic diagram, steps in a particular embodiment of the method that is the subject of the invention.

FIG. 17 shows a method for positioning a device 10 in a system comprising this device 10 and a plurality of fixed bases 12.

This method 130 comprises:

a step 131 of the emission, by the device, of a request comprising at least one pattern of points whose values are read with the pointer of the device browsing the positions of a pattern memory, the emitter of the device modulating a carrier with the values of points of the pattern read successively;

a step 132 of the reception of the first signal by a base 12;

a step 137 of the emission, by each base receiving this request, of a response;

a step 138 of the measurement, by the device 10, of a second temporal pattern offset between the values of pattern points received in each response and the values stored in the memory of the device 10 in the positions browsed successively by the pointer of the device;

a step 139 of the determination, by the device, of the distance between the device and at least four bases 12; and a step 140 of the determination of the position of the device, by the device, as a function of a known position of each fixed base having responded and of the distance relative to each of these bases, determined by the determination means.

Preferably, the first signal is in quadrature and as shown in FIG. 13.

Preferably:

during a step 133, a linear fit as described above, especially with regard to FIG. 14, is performed by the base 12;

during a step 134, a first phase shift measurement is made;

during a step 135, a first offset measurement is made by the base 12;

during a step 136, data representative of the phase shift and offset measured are incorporated into the second signal corresponding to the response to the request emitted by the base 12 for the device 10;

the step 138 comprises a measurement of the phase shift after linear fitting.

The method 130 corresponds to the embodiment C. In a variant corresponding to embodiments A and B, a base 12 behaves like a repeater of the pattern received from the device 10. The base 12 does not, therefore, need to measure the pattern offset. Nevertheless, it can:

put the carrier of the response signal in phase with the pattern received and transmit a measurement of the phase shift between the carrier of the pattern received and its clock; or phase-shift the carrier of the response signal so that this carrier is synchronised with the carrier of the request signal.

These two alternatives allow the device to measure the total phase shift due to the outward request and return response, and therefore refine the measurement of the distance between the device and the base 12.

Note that the method can comprise both a repetition by the base of the pattern it receives and also the transmission of a measurement of the offset made by this base.

Steps 91 to 93 have already been detailed with regard to FIG. 11. Steps 91 and 92 can utilise distance measurements based on the pattern offsets and/or on the phase shifts of the carriers and/or patterns.

The present invention also relates to the use of the method and/or the device that are the subjects of the invention to direct a land or aerial vehicle, direct a pedestrian, direct a person that is visually impaired or with reduced mobility in an outdoor or indoor environment, geolocate elements in the outdoor or indoor environment, indicate a parking fault for a self-service vehicle, determine the position and orientation of a visualisation system comprising several devices for augmented reality purposes for civil engineering, leisure and tourism applications, determine gestures, for example for a gesture interface, or motion capture.

The invention claimed is:

1. System for positioning a device, comprising this device and a plurality of fixed bases, the device comprising a first counter cyclically browsing a first number n of pointer positions and each base of the plurality of fixed bases comprising a second counter cyclically browsing the first number n of pointer positions during a period substantially equal to the period for browsing the number n of pointer position by the first counter of the device, system wherein:

the device comprises a first emitter configured to emit a request comprising at least one pattern of points whose values are read with the first counter of the device browsing the number n of pointer positions pointing to memory areas where values of successive points of a pattern can be recorded and read, the emitter of the device modulating a carrier with the values of the points of the pattern of points read successively with the first counter;

each base of the plurality of fixed bases receiving this request comprises a second emitter configured to respond to the request with a response:

a) repeating the pattern received by the base from the device, the second counter of the base browsing memory positions of the pattern to enter there values of pattern points then browsing these memory positions to read there the values of pattern points to be emitted, each point of the pattern therefore being temporarily offset, relative to the time of its reception by the base, by a multiple of times the period of the counter of the base and/or b) representative of a first temporal pattern offset, measured by the base, between the pattern received and an identical pattern stored in the memory of the base whose values are browsed by the pointer of the base, the values of the points of a response pattern being read successively in memory positions browsed by the pointer of the base, from a position known by the device, the emitter of the base modulating a carrier with the values of points of the pattern read successively;

the device also comprising:

a means for measuring a second temporal pattern offset between the values of pattern points received in each response and the values stored in the memory of the device in the positions browsed successively by the pointer of the device;

a means for determining a distance between the device and each base of the plurality of fixed bases as a function, respectively, of:

a) a total pattern offset between the pattern emitted by the device and the repeated pattern received by the device from the base;

b) a second pattern offset and a first pattern offset measured by the base; and a means for determining the position of the device as a function of a known position of each fixed base having responded and of the distance relative to each of these bases, determined by the determination means.

2. System according to claim 1, wherein the device, and each base of the plurality of fixed bases if it comprises a means for measuring the first and second pattern offset, comprises a means for measuring a phase shift of the carrier of a signal received relative to the phase of a sine-wave signal generated by a clock of the device, and a clock of each base of the plurality of fixed bases if it comprises a means for measuring the offset, the means for determining the distance of the device adding the measured phase shift to the measured offset to measure the distance of the device to each base of the plurality of fixed bases.

3. System according to claim 2, wherein the signal emitted by the device and by each base is in IQ quadrature and wherein, for at least one predefined phase shift of the carrier of this signal, the signal on the I channel is constant and the signal on the Q channel carries the amplitude modulation of the pattern emitted by the device.

4. System according to claim 3, wherein:

to measure the first and second offsets, the base and the device comprise a means for performing a linear fit of the points of the pattern received in an IQ plane representative of the signal in IQ quadrature, each offset measured being equal to the pattern offset added to the phase shift measured, this measured phase shift being equal to the difference between:

an angle between the vertical in this IQ plane and the straight line obtained by the linear fitting; and this predefined phase shift, or wherein:

c) each base comprises a means for performing a linear fit of the points of the pattern received in the IQ plane, and a means for measuring the phase shift, this measured phase shift being equal to the difference between the angle between the vertical in this IQ plane and the straight line obtained by the linear fitting; and this predefined phase shift;

the emitter of each base being configured to emit a negative phase-shifted IQ signal, relative to the signal received, of twice the phase shift measured so that the phase of the signal emitted by the base is in phase with the signal emitted by the device;

d) the device comprises a means for performing a linear fit of the points of the pattern received in the IQ plane, and a means for measuring the phase shift, this measured phase shift being equal to the difference between the angle between the vertical in this IQ plane and the straight line obtained by the linear fitting; and this predefined phase shift;

the total offset utilised by the device for measuring the difference being the sum of the total pattern offset added to the phase shift measured by the measurement means of the device.

5. System according to claim 1, wherein the period for browsing the number n of pointer position of the first and second counters is more than double a maximum time of flight corresponding to a predefined maximum distance between the device and a base of a plurality of fixed bases likely to respond to a request from this device.

6. System according to claim 1, wherein at least one pattern of points is an inverse Fourier transform of a spectrum with constant amplitude and random or pseudo-random phase.

7. System according to claim 1, wherein each emitter, of the device and the bases, is configured to emit signals over a plurality of carriers having different frequencies.

8. System according to claim 1, wherein the system comprises at least two devices, the patterns emitted by all the devices and by all the bases of the plurality of fixed bases are identical or wherein the patterns emitted by at least two different devices are different, the signal emitted by each device comprising data identifying or representing the pattern emitted by said device.

9. System according to claim 1, wherein the patterns emitted by at least two different bases are different, the signal emitted by each base comprising data identifying or representing the pattern emitted by this base.

10. System according to claim 1, wherein each signal emitted by a base of the plurality of fixed bases comprises an identifier of this base, the determination means of the device being configured to determine the position of this base by means of its identifier.

11. System according to claim 1, wherein the identifier of the base of the plurality of fixed bases comprises its geographic position.

12. System according to claim 1, wherein the system comprises at least two devices wherein the frequencies of the signals emitted by all the devices and all the bases of the plurality of fixed bases are in an ISM (industrial, scientific, and medical) band.

13. Device to be positioned relative to a plurality of fixed bases comprising a first counter cyclically browsing a first number n of pointer positions and each base comprising a second counter cyclically browsing the first number n of pointer positions during a period substantially equal to the period for browsing the number n of pointer position by the first counter of the device, wherein:

the device comprises a first emitter configured to emit a request comprising at least one pattern of points whose values are read with the first counter of the device browsing the number n of pointer positions pointing to memory areas where values of successive points of a pattern can be recorded and read, the emitter of the device modulating a carrier with the values of the points of the pattern of points read successively with the first counter;

each base of a plurality of fixed bases receiving this request comprises a second emitter configured to respond to the request with a response:

a) repeating the pattern received by the base from the device, the second counter of the base browsing memory positions of a pattern of at least one pattern of points to enter there values of pattern points then browsing these memory positions to read there the values of pattern points to be emitted, each point of the pattern therefore being temporarily offset, relative to the time of its reception by the base, by a multiple of times the period of the counter of the base and/or b) representative of a first temporal pattern offset, measured by the base, between the pattern received and an identical pattern stored in the memory of the base whose values are browsed by the pointer of the base, the values of the points of a response pattern being read successively in memory positions browsed by the pointer of the base, from a position known by the device, the emitter of the base modulating a carrier with the values of points of the pattern read successively;

the device also comprising:

a means for measuring a second temporal pattern offset between the values of pattern points received in each response and the values stored in the memory of the device in the positions browsed successively by the pointer of the device;

a means for determining a distance between the device and each base as a function, respectively, of:

a) a total pattern offset between the pattern emitted by the device and the repeated pattern received by the device from the base;

b) a second pattern offset and a first pattern offset measured by the base; and a means for determining the position of the device as a function of a known position of each fixed base having responded and of the distance relative to each of these bases, determined by the determination means.

14. Base of a plurality of fixed bases for positioning a device comprising a first counter cyclically browsing a first number n of pointer positions and each base comprising a second counter cyclically browsing the first number n of pointer positions during a period substantially equal to the period for browsing the number n of pointer position by the first counter of the device, wherein:

the device comprises a first emitter configured to emit a request comprising at least one pattern of points whose values are read with the first counter of the device browsing the number n of pointer positions pointing to memory areas where values of successive points of a pattern can be recorded and read, the emitter of the device modulating a carrier with the values of the points of the pattern of points read successively with the first counter;

each base of a plurality of fixed bases receiving this request comprises a second emitter configured to respond to the request with a response:

a) repeating the pattern received by the base from the device, the second counter of the base browsing memory positions of a pattern of at least one pattern of points to enter there values of pattern points then browsing these memory positions to read there the values of pattern points to be emitted, each point of the pattern therefore being temporarily offset, relative to the time of its reception by the base, by a multiple of times the period of the counter of the base and/or b) representative of a first temporal pattern offset, measured by the base, between the pattern received and an identical pattern stored in the memory of the base whose values are browsed by the pointer of the base, the values of the points of a response pattern being read successively in memory positions browsed by the pointer of the base, from a position known by the device, the emitter of the base modulating a carrier with the values of points of the pattern read successively;

the device also comprising:

a means for measuring a second temporal pattern offset between the values of pattern points received in each response and the values stored in the memory of the device in the positions browsed successively by the pointer of the device;

a means for determining a distance between the device and each base as a function, respectively, of:

a) a total pattern offset between the pattern emitted by the device and the repeated pattern received by the device from the base;

b) a second pattern offset and a first pattern offset measured by the base; and a means for determining the position of the device as a function of a known position of each fixed base having responded and of the distance relative to each of these bases, determined by the determination means.

15. Base of a plurality of fixed bases according to claim 14, configured to behave like a device towards other bases of a plurality of fixed bases to verify its positioning, wherein the emitter is configured to emit a displacement message if the position determined is different from a previously saved position of this base.

16. Base of a plurality of fixed bases according to claim 14, configured to behave like a device towards other bases associated with cadastral points to determine its position.

17. Method for positioning a device in a system comprising this device and a plurality of fixed bases, the device comprising a first counter cyclically browsing a first number n of pointer positions and each base of the plurality of fixed bases comprising a second counter cyclically browsing the first number n of pointer positions during a period substantially equal to the period for browsing the number n of pointer positions by the first counter of the device, method characterised in that it comprises:

a first step of emission, by the device, of a request comprising at least one pattern of points whose values are read with the first counter of the device browsing the number n of pointer positions pointing to memory areas where values of successive points of a pattern can be recorded and read, the emitter of the device modulating a carrier with the values of points of the pattern of points read successively;

a second step of emission, by each base of the plurality of fixed bases receiving this request, of a response;

a) repeating the pattern received by the base from the device, the second counter of the base browsing memory positions of the pattern to enter there the values of pattern points then browsing these memory positions to read there the values of pattern points to be emitted, each point of the pattern therefore being temporarily offset, relative to the time of its reception by the base, by a multiple of times the period of the counter of the base and/or b) representative of a first temporal pattern offset, measured by the base, between the pattern received and an identical pattern stored in the memory of the base whose values are browsed by the pointer of the base, the values of the points of a response pattern being read successively in memory positions browsed by the pointer of the base, from a position known by the device, the emitter of the base modulating a carrier with the values of points of the pattern read successively;

a step of the measurement, by the device, of a second temporal pattern offset between the values of pattern points received in each response and the values stored in the memory of the device in the positions browsed successively by the pointer of the device;—a step of the determination, by the device, of a distance between the device and each base of the plurality of fixed bases as a function, respectively, of:

a) a total pattern offset between the pattern emitted by the device and the repeated pattern received by the device from the base;

b) a second pattern offset and a first pattern offset measured by the base; and a step of the determination of the position of the device, by the device, as a function of a known position of each fixed base having responded and of the distance relative to each of these bases, determined by determination means.

18. Method according to claim 17, which comprises a step of assigning time intervals, or timeslots, to fixed bases according to their geographic position such that two fixed bases that exchange signals with the same fixed base do not have the same time interval assigned to each of them and to this same fixed base.

19. Method according to claim 17, which comprises a step of positioning fixed bases with respect to other bases associated to cadastral points.

20. Use of the method according to claim 17, of the system according to claim 1, the device according to claim 13, and/or the base of a plurality of fixed bases according to claim 14, to direct a land vehicle or aerial vehicle, direct a pedestrian indoors or outdoors, indicate a parking fault for a self-service vehicle, geolocate elements in an environment, determine the position and orientation of a visualisation system comprising several devices for augmented reality purposes for civil engineering, leisure and tourism applications, determine gestures, for example for a gesture interface, or motion capture.

* * * * *